(12) United States Patent
Raghavan et al.

(10) Patent No.: US 9,015,150 B2
(45) Date of Patent: Apr. 21, 2015

(54) DISPLAYING RESULTS OF KEYWORD SEARCH OVER ENTERPRISE DATA

(71) Applicant: Oracle International Corporation, Redwood Shores, CA (US)

(72) Inventors: Nikhil Raghavan, San Francisco, CA (US); Ravi Murthy, Saratoga, CA (US); Aman Naimat, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 30 days.

(21) Appl. No.: 13/923,072

(22) Filed: Jun. 20, 2013

(65) Prior Publication Data
US 2013/0282710 A1 Oct. 24, 2013

Related U.S. Application Data

(62) Division of application No. 13/398,799, filed on Feb. 16, 2012, now Pat. No. 8,484,208.

(51) Int. Cl.
*G06F 17/30* (2006.01)
*G06F 7/00* (2006.01)

(52) U.S. Cl.
CPC .... *G06F 17/30554* (2013.01); *G06F 17/30941* (2013.01)

(58) Field of Classification Search
CPC .................................................. G06F 17/3061
USPC ................................................. 707/728, 722
See application file for complete search history.

(56) References Cited

U.S. PATENT DOCUMENTS

| 5,818,435 A * | 10/1998 | Kozuka et al. ................. 715/202 |
| 5,917,488 A * | 6/1999 | Anderson et al. ............. 715/838 |
| 6,381,601 B1 * | 4/2002 | Fujiwara et al. .............. 707/692 |
| 7,437,358 B2 | 10/2008 | Arrouye et al. |
| 7,650,343 B2 * | 1/2010 | Fellenberg et al. ......... 707/999.1 |
| 2001/0032204 A1 * | 10/2001 | Hoashi et al. ..................... 707/5 |
| 2003/0200034 A1 * | 10/2003 | Fellenberg et al. ............. 702/20 |
| 2005/0154725 A1 * | 7/2005 | Day et al. .......................... 707/5 |

(Continued)

OTHER PUBLICATIONS

U.S. Appl. No. 13/398,792, filed Feb. 16, 2012, Office Action, Jun. 19, 2013.

(Continued)

*Primary Examiner* — Pavan Mamillapalli
(74) *Attorney, Agent, or Firm* — Hickman Palermo Becker Bingham LLP

(57) ABSTRACT

Techniques are disclosed for presenting semi-structured sets of search results comprising two or more differently-structured subsets of search results. The search results are divided into two or more groups of similarly-structured results. The search results are displayed in their respective groups rather than as a single set. Each group is displayed using a different display structure, in an order determined by a group ranking mechanism. The search results within a group ordered by a result ranking mechanism. Techniques are also disclosed for enhancing a display of similarly structured data by emphasizing highly relevant result fields. The highly relevant result fields may be identified based on metadata ranking mechanisms, uniqueness of their constituent values, historical feedback, keyword location, and/or other mechanisms. The fields are emphasized using, without limitation, highlighting, reordering, and filtering of unemphasized fields from the display.

20 Claims, 11 Drawing Sheets

(56) References Cited

U.S. PATENT DOCUMENTS

| | | |
|---|---|---|
| 2005/0220351 A1 | 10/2005 | Vanderwende et al. |
| 2005/0289109 A1 | 12/2005 | Arrouye et al. |
| 2006/0036581 A1* | 2/2006 | Chakrabarti et al. ............. 707/3 |
| 2006/0101017 A1* | 5/2006 | Eder ................................ 707/7 |
| 2006/0116994 A1* | 6/2006 | Jonker et al. ...................... 707/3 |
| 2006/0161535 A1* | 7/2006 | Holbrook ........................... 707/3 |
| 2007/0266007 A1* | 11/2007 | Arrouye et al. ................... 707/3 |
| 2011/0106819 A1* | 5/2011 | Brown et al. .................. 707/749 |
| 2012/0215785 A1 | 8/2012 | Singh et al. |
| 2013/0218898 A1 | 8/2013 | Raghavan et al. |
| 2013/0218899 A1 | 8/2013 | Raghavan et al. |

OTHER PUBLICATIONS

U.S. Appl. No. 13/398,792, filed Feb. 16, 2012, Notice of Allowance, Dec. 2, 2013.

* cited by examiner

DISPLAYING RESULTS OF KEYWORD SEARCH OVER ENTERPRISE DATA

CROSS-REFERENCE TO RELATED APPLICATIONS; BENEFIT CLAIM

This application claims benefit under 35 U.S.C. §120 as a Divisional of U.S. patent application Ser. No. 13/398,799, filed Feb. 16, 2012, the entire content of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

This application is related to U.S. patent application Ser. No. 13/398,792, filed on Feb. 16, 2012, entitled "MECHANISMS FOR METADATA SEARCH IN ENTERPRISE APPLICATIONS," by Raghavan et al. (hereinafter "Metadata Application"); and U.S. patent application Ser. No. 13/398,794, filed on Feb. 16, 2012, entitled "MECHANISMS FOR SEARCHING ENTERPRISE DATA GRAPHS," by Raghavan et al. (hereinafter "Search Result Display Application"), the entire contents of each of which are hereby incorporated by reference for all purposes as if fully set forth herein.

TECHNICAL FIELD

Embodiments relate generally to data search, and, more specifically, to techniques for presenting search result sets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Structured Data

The data within databases, document repositories, and other data sources are often structured in accordance with a common underlying format. The common underlying format is typically well-understood by general-purpose data access components such as database servers or extended markup language (XML) parsers. Examples of such formats include, without limitation, relational tables, hierarchical trees, and XML.

For many of these underlying formats, conforming structures may be characterized abstractly as sets of hierarchical nodes. For example, in XML and other hierarchical mark-up languages, nodes are delimited by a pair of corresponding start and end tags, which not only delimit the node, but also specify the name of the node. For example, in the following structured data fragment, <A><B>5</B><D>10</D></A>, the start tag <A> and the end tag </A> delimit a node having name A. The data between the corresponding tags is referred to as the node's content. A node's content can either be a scalar value (e.g. integer, text string), or one or more other nodes. A node that contains only a scalar value is referred to herein as a scalar node. A node that contains another node is referred to herein as a structured node. The contained nodes are referred to herein as descendant nodes. In addition to containing one or more nodes, a structured node's content may also include a scalar value. Such content in a node is referred to herein as mixed content.

A structured node thus forms a hierarchy of nodes with multiple levels, the structured node being at the top level. A node at each level is linked to one or more nodes at a different level. Each node at a level below the top level is a child node of a parent node at the level above the child node. Nodes having the same parent are sibling nodes. A parent node may have multiple child nodes. A node that has no parent node linked to it is a root node, and a node that has no child nodes linked to it is a leaf node. For example, in structured node A, node A is the root node at the top level. Nodes B and D are descendant and child nodes of A, and with respect to each other, nodes B and D are sibling nodes. Nodes B and D are also leaf nodes.

In some embodiments, relational tables may be representative of node-based structures. For example, a node may be represented by rows in one or more tables that share a same unique identifier or key. Attributes may be represented by the values for various fields of those rows. Links may be represented by object-identifying values in other columns of those rows. Various other representations may also be used.

Metadata

Structured data may further be organized in accordance with schemas and/or other information that define structural and content constraints for the structured data, beyond those constraints inherent in the underlying structure of that data. Even within the same data source, different structural and content constraints may apply to data objects, such as nodes, that have the same abstract structures. For example, each row of data in a relational database is already subject to constraints inherent to all relational databases. Yet, rows within one table of a database may further conform to schema-dictated constraints for data used to represent customers, while rows within another table in the same database may instead further conform to schema-dictated constraints for data used to represent purchase orders.

The term metadata is used herein to refer to any information, including schemas, that defines structures and/or constraints for structured data. Metadata may comprise one or more units, of varying complexity and granularity, which are hereinafter referred to as items of metadata, or "metadata items." Metadata items may comprise, reference, or embed, other metadata items. Each metadata item may be described as a "node," and each metadata item may be mapped to one or more specific data objects for which it defines constraints. This disclosure may at times refer to a set of metadata items as a "collection of metadata," "metadata collection," or simply "metadata."

Metadata serves, in one aspect, as a blueprint of how data objects are to be constructed. There are many practical applications of metadata, including without limitation the validation of data input and the optimization of processes such as data parsing, data encoding, and data compression. In an embodiment, metadata may comprise a set of formulas, sentences, rules, objects, or other elements expressed in a formalized language, which in turn specify integrity constraints imposed upon one or more data sources.

Metadata may be created explicitly in a variety of manners, including importations of comprehensive top-down schemas by dedicated data architects, or piecemeal input from end-users providing decentralized bottom-up definitions of individual metadata items. Metadata may further be "discovered" through analyses processes that utilize pattern matching, machine learning, and/or other techniques to classify data objects. The metadata that describes a given structured data object may be identified using a variety of mechanisms, including explicit mappings in the form of markup language or type identifiers internal to the data objects, explicit mappings in external tables that map data objects to metadata by references, and mappings determined using structure recognition processes.

One example of metadata is enterprise application metadata, such as may be used for an extended markup language (XML) application platform. Enterprise application metadata may be used to describe a model for a variety of types of data, including XML and database objects, as discussed in the following paragraphs. In an embodiment, the enterprise application metadata model comprises metadata items that are collectively defined by at least three constructs: elements, types, and states. Elements provide a name and semantic meaning to a data item, whereas types and states provide data validation rules. However, in other embodiments the metadata model may comprise additional or fewer constructs. In an embodiment, enterprise application metadata is stored in representative form within a database system. For example, enterprise application metadata may be represented by tables (or objects), columns (or fields), and relationships between tables and columns (or links).

Another example of metadata is an XML schema. An XML schema is a description of a type of XML document. In an embodiment, an XML schema is expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints. In an embodiment, an XML Schema is itself comprised of a variety of inter-related metadata items, including element type declarations, attribute declarations, entity declarations, notation declarations. An XML schema may be expressed in an XML schema language. Specific examples of an XML schema language include, without limitation, Document Type Definition (DTD), XML Schema (as defined by XML Schema, Part 0, Part 1, Part 2, W3C Recommendation, 2 May 2001; XML Schema Part 1: Structures, Second Edition, W3C Recommendation 28 Oct. 2004; XML Schema 1.1 Part 2: Datatypes, W3C Working Draft 17 Feb. 2006; and XML Schema Part 2: Datatypes Second Edition, W3C Recommendation 28 Oct. 2004, the entire contents of each of which are incorporated herein by reference for all purposes), and RELAX NG.

A database schema is yet another example of metadata. A database schema may comprise metadata items that describe any or all of tables, fields, relationships, views, indexes, packages, procedures, functions, queues, triggers, types, sequences, materialized views, synonyms, database links, directories, and so forth. The database schema may be stored in, for example, a data dictionary within the database. Other types of metadata are also within the scope of this disclosure, including, without limitation, Java object models and other object-based frameworks.

It is at times desirable to locate specific items of metadata, for any of a variety of reasons. To this end, in an embodiment, specific items of metadata may be located using keyword searches on item names and/or descriptions. For example, a data administrator may need to identify the structure of a database, or even reorganize the database. Or, a data administrator may wish to re-use pre-existing metadata items or link to existing data objects when developing the structure of a new data repository.

In an embodiment, metadata is developed in a decentralized manner by a number of end-users forming a community. For example, a community of scientists or doctors may subscribe and/or maintain shared metadata and/or data repositories that are accessible via a variety of applications at any number of locations. In such communities, many diverse end-users may create many types of data objects. Other end-users may wish to locate, use, or even build on top of metadata items already defined by the community. An example of decentralized metadata is described in U.S. application Ser. No. 13/221,832, entitled "Validating XML Documents Based on Decentralized Schemas," and filed Aug. 31, 2011, the entire contents of which are herein incorporated by reference for all purposes.

Normalized Data

Data in large data repositories, including enterprise application data, is often normalized to various degrees. Normalization involves dividing large data objects with many components into smaller (and less redundant) data objects with fewer components. The smaller data objects have relationships defined between them from which the larger data objects may be reconstructed. One objective of data normalization is to isolate data so that additions, deletions, and modifications of a field can be made in just one location, with the effect propagated through the rest of the data repository via the defined relationships. Another objective of normalization is to reduce redundancy by having a single, self-contained data object for each unit of data that is re-useable, such as addresses, names, and components thereof.

For example, the following XML-based data object for purchase orders includes address information that is redundant.

```
<orders>
    <order id="1">
        <customer>John Doe</customer>
        <product>Brand X Tablet Computer</product>
        <shipping_address>
            <street>123 Main St</street>
            <city>Santa Clara</city>
            <zip>95050</zip>
        </shipping_address>
    </order>
    <order id="2">
        <customer>John Doe</customer>
        <product>Brand Y Binoculars</product>
        <shipping_address>
            <street>123 Main St</street>
            <city>Santa Clara</city>
            <zip>95050</zip>
        </shipping_address>
    </order>
    ...
</orders>
```

Regardless of whether this representation reflects how a company may wish to view its data, storage of the data in this manner would be less than desirable for a number of reasons. One way to normalize this data would be to divide the above data object into multiple referential objects such as set forth below:

```
<orders>
    <order id="1" />
    <order id="2" />
    ...
</orders>
```

```
<order id="1">
    <customer id="100" />
    <product id="201"/>
</order>
<order id="2">
    <customer id="100" />
    <product id="412"/>
</order>
<customer id="100">
    <name> John Doe</name>
    <shipping_address id="1011" />
</customer>
<product id="201">
    <name> Brand X Tablet Computer</name>
</product>
<product id="412">
    <name> Brand Y Binoculars </name>
</product>
< address id="1011">
    <street>123 Main St</street>
    <city>Santa Clara</city>
    <zip>95050</zip>
</ address>
```

The original view of the orders data object is easily reconstructed from the normalized version. Other techniques for normalizing this data may also exist, with varying degrees of normalization.

Various standards exist for data normalization, including without limitation Third Normal Form, which was originally defined in Codd, E. F. "Further Normalization of the Data Base Relational Model". (Presented at Courant Computer Science Symposia Series 6, "Data Base Systems", New York City, May 24-25, 1971.) IBM Research Report RJ909 (Aug. 31, 1971), Republished in Randall J. Rustin (ed.), Data Base Systems: Courant Computer Science Symposia Series 6. Prentice-Hall, 1972, the entire contents of which are herein incorporated by reference for all purposes. Use of the term "normalized data" is not necessarily limited to any particular standard for normalization.

Unstructured Search on Normalized Data

Common search techniques for normalized data rely upon structured queries. Structured queries, such as queries in formal query languages like Structured Query Language (SQL), require that the querying user be aware of both the structure of a data repository and a syntax for referencing the different structural elements. As such, structured queries are often not useful for end-users.

Unstructured search techniques involve queries comprising little more than a set of search terms, without requiring any indication of the structures that should actually be searched for those terms. Many unstructured query techniques rely upon locating data objects that match multiple, if not all, search parameters. For example, in the context of web search, the most highly relevant search results are typically web pages that contain multiple search terms. If, for instance, the un-normalized "order" objects above were individual web pages, the order object with an id of "1" would be considered to be a highly relevant search result for the keyword-based query: "John Tablet 95050."

Unstructured search techniques are problematic in the context of normalized data. For instance, the same query "John Tablet 95050," considered conjunctively, would fail to produce a single data object in the normalized XML from above, as there is no object that contains all three of the terms "John," "Tablet," and "95050." One approach to this problem would be to disjunctively return each data object that matched any term in the search. However, such an approach fails to provide information about the relationships between data objects, and further produces a large number of highly irrelevant results. For example, a disjunctive query "John Tablet 95050" on normalized data would potentially yield many customer, address, and product objects that match "John," "Tablet," or "95050," without actually returning any order object.

Another category of approaches for searching normalized data involve reconstructing (or "flattening") large data objects by joining the relations of the normalized data objects, and then performing a search on the reconstructed data objects. Some examples of such techniques include candidate-network based solutions such as DISCOVER and DBXplorer. Such techniques require clear constraints on which types of data objects are to be reconstructed and/or a large amount of memory to reconstruct all of the possible data objects. Otherwise, not only may computing resources be exhausted reconstructing each and every possible data object within a repository, but the results themselves may contain many data objects that are not particularly interesting. For example, in the context of the above normalized XML, searching reconstructed data objects for "John Tablet 95050" may be useful if the domain of the search is restricted only to "order" objects. However, without some kind of domain restriction, the "orders," "product," "customer," and "address" objects will also need to be individually reconstructed and searched. Moreover, the "orders" object would also be returned as a search result, which would be less useful for the user because the user would then have to wade through each order inside of the orders object to find if there is a relevant order. Unfortunately, it is challenging to impose useful domain restrictions on object reconstruction without schema awareness on the part of the searcher or pre-defined limitations on the field of search.

Another category of approaches for searching normalized data involves graph-based techniques such as BANKS, BLINKS, or DBPF. Graph-based techniques do not require schema awareness. However, while graph-based techniques have been applied to clearly defined and limited data repositories, the techniques suffer from various performance problems with larger and/or changing data repositories. Example graph-based techniques are described, for instance, in "BANKS: Browsing and Keyword Searching in Relational Databases," Aditya et al., Proceedings of the 28th VLDB Conference, Hong Kong, China, 2002; and "BLINKS: Ranked Keyword Searches on Graphs," He et al., SIGMOD'07, Jun. 11-14, 2007, Beijing, China. The entire contents of each of these documents are hereby incorporated by reference for all purposes as if set forth herein.

Presenting Search Results

In some embodiments, a set of search results returned using search techniques such as described above may be structured. A structured set of search results is a set of one or more data objects that conform to a same or similar structure. For example, in the context of a relational database, a structured set of search results may be a set of rows from a same table. Or, the structured set of search results may be a result set in which each row possesses values for the same columns or fields. As another example, in the context of XML, a structured set of search results may be a set of elements that conform to the same schema definition, or that possess the same attributes and child elements.

Presentation techniques for structured sets of search results are typically straightforward. Because each search result possesses the same structure, that structure may be utilized to render the search results to a user in an intuitive form that allows the user to quickly digest and compare results. For example, rows that share the same columns or fields may easily be presented as a table. Other presentation techniques similarly leverage the common structure of a structured set to present search results.

In some embodiments, a set of search results returned using search techniques such as described above may be unstructured. In contrast to a structured set of search results, the search results in an unstructured set of search results do not each conform to common structure. Individual search results in an unstructured set may still conform to a defined structure; however there is no defined structure that is common to the entire set. Thus, the set is said to be unstructured. An example of an unstructured set of search results in the context of a relational database would be a set of rows in which at least a first row of the set did not possess the same columns or fields as at least a second row of the set. As another example, in the context of XML, an unstructured set of search results may be a set of elements in which at least a first element of the set does not conform to the same schema definition as at least a second element of the set, or the elements do not each possess the same attributes and child elements.

Because at least some of the search results in an unstructured set of search results may not conform to the same structure as other search results in an unstructured set, presenting unstructured sets of search results can be more challenging than presenting structured sets of search results. One technique for presenting unstructured sets involves flattening each search result into unstructured text. The unstructured text (or excerpts thereof) for each search result may be displayed in a list or other suitable structure, as in a conventional web search result page. However, by reducing a structured search result to unstructured text, such techniques fail to provide a user with potentially significant information about the structure of each search result.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
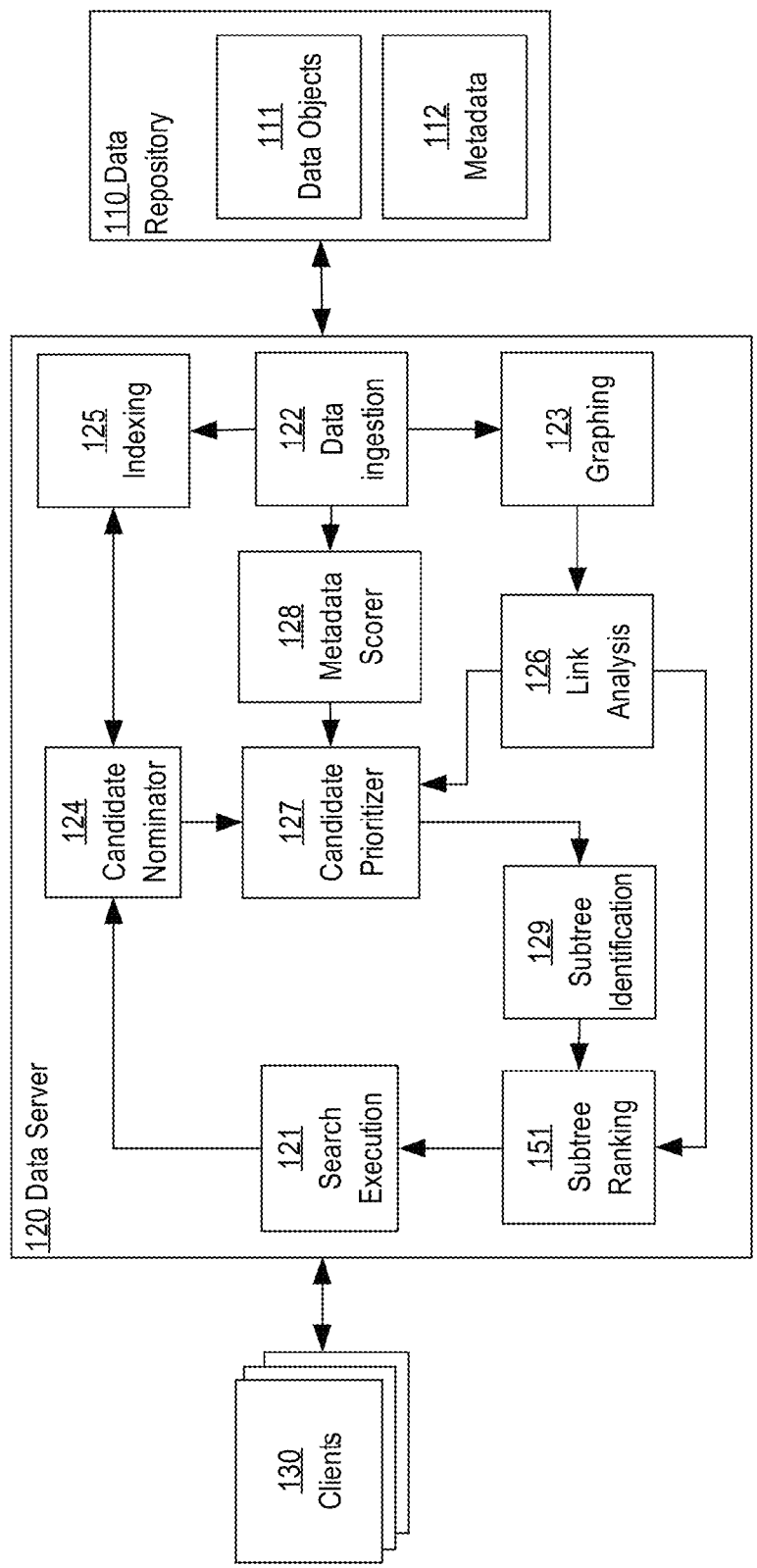
FIG. 1A is a block diagram that illustrates an example system in which unstructured search techniques described herein may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
   2.0. Structural Overview
   3.0. Functional Overview—Unstructured Search
      3.1. Search Request
      3.2. Data Ingestion
      3.3. Indexing
      3.4. Graphing
      3.5. Identifying Candidate Nodes
      3.6. Intersecting Disjunctive Candidate Node Vectors
      3.7. Link Analysis Scoring of Candidate Nodes
      3.8. Metadata-Based Scoring of Candidate Nodes
      3.9. Prioritizing/Pruning Candidate Nodes
      3.10. Locating Search Result Subgraphs
      3.11. Termination Events/Constraints
      3.12. Ranking Search Result Subgraphs
      3.13. Returning the Result Set
      3.14. Variations
   4.0. Implementation Examples—Unstructured Search
      4.1. Example Search Result Subgraph Identification Flow
      4.2. Walk-Through for Example Technique
      4.3. Example Data Object Graph
      4.4. Example Metadata Graph
      4.5. Example MetaData and Data
   5.0. Functional Overview—Presenting Search Results
      5.1. Identifying Search Results
      5.2. Identifying Groups of Similarly Structured Search Results
      5.3. Ranking the Groups
      5.4. Deciding Which Fields to Display
      5.5. Identifying Group Display Structures
      5.6. Rendering the Results
      5.7. Returning the Search Results
      5.8. Variations
   6.0. Functional Overview—Identifying Highly Relevant Search Result Fields
   7.0. Implementation Examples—Presenting Search Results
   8.0. Implementation Mechanism—Hardware Overview
   9.0. Extensions and Alternatives 1.0. General Overview Approaches, techniques, and mechanisms are disclosed for presenting semi-structured sets of search results. A semi-structured set of search results is an otherwise unstructured set comprising two or more differently-structured subsets of search results. The set of search results is divided into two or more groups of similarly structured search results. The search results are displayed in their respective groups rather than as a single set. Each group is displayed using a different display structure, in an order determined by a group ranking mechanism. The search results within a group ordered by a result ranking mechanism.

Approaches, techniques, and mechanisms are also disclosed for enhancing the display of a structured set of data, including a structured set of search results, by emphasizing highly relevant result fields, such as columns, attributes, and/or sub elements of the results. The highly relevant result fields may be identified, for example, based on metadata ranking mechanisms, uniqueness of their constituent values, historical feedback, keyword location, and/or other mechanisms. The highly relevant fields are emphasized using any suitable technique, including without limitation, highlighting, reordering, and filtering of unemphasized fields from the display.

In an embodiment a server receives a search request. The server identifies search results responsive to the search request. The server identifies individual rankings for the search results. The server divides the search results into groups based on how the search results are structured. For each particular group of said groups, the search results in the particular group conform to a common structure. Search results in different groups of said groups conform to different structures. The server identifies group rankings for the groups. The server generates a search report responsive to the search request. The search report comprises a plurality of sections, including a different section for each group. The plurality of sections is ordered by the group rankings. Each section comprises views of data belonging to the search results of the section's respective group. The views in each section are ordered by the individual rankings.

In an embodiment, the server identifies, for each group, a) a different display structure and b) a mapping of data from the common structure for the group to the display structure for the group. The server generates a view for each search result of at least a subset of the search results based at least on the display structure and the mapping that were identified for the group to which the search result belongs.

In an embodiment, the server identifies, for at least a particular group, a set of highly relevant fields of the common structure corresponding to the particular group. The server emphasizes data from highly relevant fields in the views for the particular group. In an embodiment, the server emphasizes data from the highly relevant fields in the views for the particular group by omitting data from fields other than the highly relevant fields in the views for the particular group.

In an embodiment, the search results comprise two or more differently structured hierarchical data objects. In an embodiment, each view in a set of the views comprises values for leaf nodes of a corresponding data object of the hierarchical data objects. In an embodiment, each view in the set of views omits values for less relevant leaf nodes of the corresponding data object. In an embodiment, each view in the set of views comprises a link to view of a complex descendant node of the corresponding data object. In an embodiment, the search results comprise two or more differently structured data rows.

In an embodiment, the search report comprises a plurality of tables. Each section is one of the plurality of tables, comprising a plurality of columns that correspond to fields of the common structure for the group corresponding to the section. Each view is a row in one of the plurality of tables, comprising a plurality of cells holding data extracted or derived from values for the fields of the common structure for the group. Each of the plurality of tables comprises a different set of columns.

In an embodiment, at least some of the views comprise abridged or excerpted snippets of the data belonging to a corresponding data object. In an embodiment, dividing the search results comprises: determining that a set of the search results is associated with a common metadata element; and assigning the set of the search results to a particular group of said groups. The common structure for the particular group is the common metadata element. In an embodiment, dividing the search results comprises: determining that a set of the search results is associated with two or more similar, but different metadata elements; assigning the set of the search results to a particular group of said groups; and determining a common display structure for the particular group based on the two or more similar, but different metadata elements.

In an embodiment, a server receives a request for data. The server identifies results responsive to the request. Each search request comprises values for a common set of fields. The server identifies, based on the common set of fields, a subset of highly relevant fields in the common set of fields. The server generates, for each result of the results, a view of data in the result, the view emphasizing data for the set of highly relevant fields. The server generates a report comprising each of the views.

In an embodiment, emphasizing data for the set of highly relevant fields comprises omitting data for fields other than the highly relevant fields. In an embodiment, emphasizing data for the set of highly relevant fields comprises highlighting columns corresponding to the highly relevant fields.

In an embodiment, identifying the set of highly relevant fields comprises calculating relevance scores for each field in the common set of fields and comparing the relevance scores. In an embodiment, identifying the set of highly relevant fields is based at least in part on metadata scores identified for metadata defining each field of the common set of fields. In an embodiment, identifying the set of highly relevant fields is based at least in part on the frequency with which null values appear in the results for a particular field of the common set of fields. In an embodiment, identifying the set of highly relevant fields is based at least in part on the distinctiveness of values appearing in the results for a particular field of the common set of fields. In an embodiment, identifying the set of highly relevant fields is based at least in part on data indicating that the user has marked a particular field of the common set of fields as highly relevant.

In an embodiment, each of the views is a row of data values belonging to a corresponding result, the row comprising cells of data extracted or derived from values for at least the set of highly relevant fields. In an embodiment, the request is a SQL statement. In an embodiment, the request comprises search terms.

In other aspects, the invention encompasses computer apparatuses and a computer-readable media configured to carry out the foregoing steps.

2.0. Structural Overview

FIG. 1A is a block diagram that illustrates an example system 100 in which unstructured search techniques described herein may be implemented. System 100 comprises a data server 120 that is coupled to a data repository 110 and multiple clients 130 via one or more networks 140. System 100 is but one example of a system in which the techniques described herein may be practiced. Other systems for practicing the techniques described herein may include fewer or additional components, in varying arrangements.

Data repository 110 includes data objects 111 and metadata 112. Data repository 110 may comprise any type(s) of data source(s), including without limitation a relational database, an XML document collection, a multidimensional database, flat files, and so forth. Data repository 110 may be stored in a central location, or distributed amongst multiple locations. Data objects 111 may conform to any of a variety of underlying formats, including XML and/or relational database objects. Metadata 112 may likewise take any one or more of the forms described elsewhere in this application. In an embodiment, data repository 110 is little more than a storage system that communicates conventional data blocks to data server 120 via conventional I/O operations. In embodiments, data repository 110 may comprise data handling components such as an XML parser or database server. In an embodiment, data repository 110 may not actually include metadata 112. For example, metadata 112 may be located external to data repository 110, or the techniques described herein may be practiced without the use of metadata 112.

Data server 120 comprises a search execution component 121 for receiving, processing, and returning search results to clients 130. In some embodiments, the search execution component 121 may be assisted by an ingestion component 122, graphing component 123, candidate nominating component 124, indexing component 125, link analysis component 126, candidate prioritizing component 127, metadata scoring component 128, subgraph identification component 129, and/or subgraph ranking component 151. The varying functions of each of these components are described in subsequent sections. An example information flow for communications between the components is depicted in FIG. 1A; however, many other information flows are also possible. Each of these components may be logically separate and distinct components, some or all of these components may be part of the same component, and/or the functionality performed by these components may be divided amongst other components. Various depicted components may be omitted from embodiment to embodiment.

Clients 130 may include standalone clients such as web browsers, integrated development environments, and/or other desktop applications executing at end-user workstations. Clients 130 may also or instead include middleware applications executing at application servers, which may themselves be in communication with end-user workstations or other clients 130. System 100 may include any number of clients 130, and some or all of clients 130 may execute on some of the same computing devices as server 120.

Clients 130 may issue a variety of data-oriented requests to data server 120, including search requests. Depending on the embodiment, clients 130 may issue search requests to data server 120 in any of a variety of suitable forms using any of a variety of protocols, including HTTP, SQL, XML, and so forth. In an embodiment, each of the search requests indicates a search operation that data server 120 is to perform by searching data objects 111. Clients 130 also receive responses to the search requests from data server 120 in any of variety of suitable forms using any of a variety of protocols. For example a first client 130 may receive a web page containing table-formatted search results, while another client 130 may receive search results in the form of a ResultSet, JSON object, XML stream, or any other suitable structure.

Figure 1B:
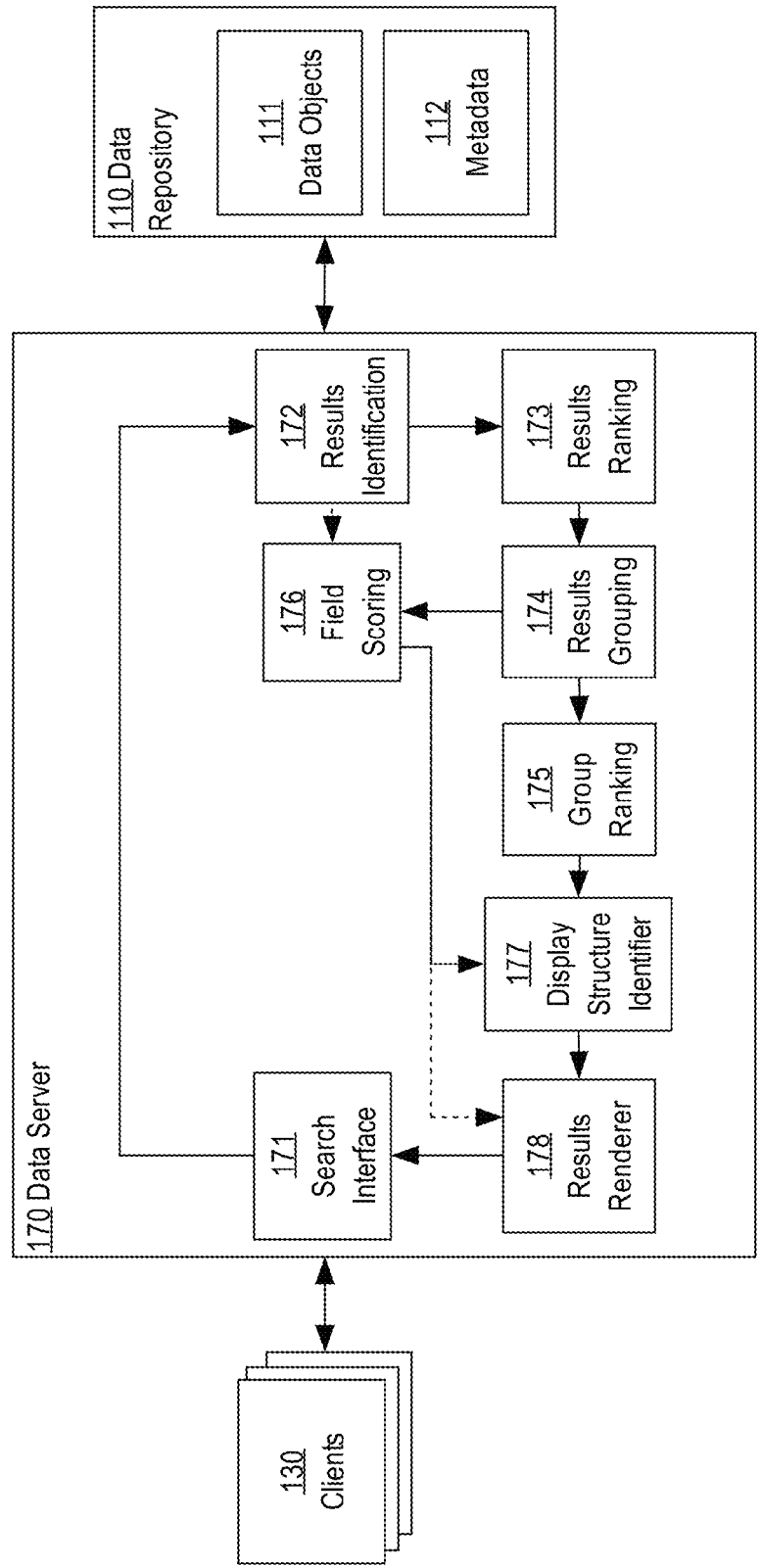
FIG. 1B is a block diagram that illustrates an example system in which search presentation techniques described herein may be implemented.

FIG. 1B is a block diagram that illustrates an example system 160 in which search presentation techniques described herein may be implemented. Like system 100, system 160 comprises a data repository 110, multiple clients 130, and one or more networks 140. However, system 160 comprises data server 170 in place of data server 120. System 160 is but one example of a system in which the techniques described herein may be practiced. Other systems for practicing the techniques described herein may include fewer or additional components, in varying arrangements.

In an embodiment, data server 170 is the same as data server 120, and the different depictions in FIG. 1A and FIG. 1B simply provide different views of data server 120/170 so as to better illustrate its various components. In other embodiments, data server 170 is an entirely different server than data server 120. For example, data server 120 may be a search server optimized for unstructured search over a repository 110 that stores XML, while data server 170 may be a database server optimized for SQL commands over a repository 110 that stores relational databases.

Data server 170 comprises a search interface component 171, results identification component 172, results ranking component 173, results grouping component 174, group ranking component 175, field scoring component 176, display structure identification component 177, and rendering component 178. Similar or equivalent to search execution component 121, search interface component 171 receives and responds to search requests. Results identification component 172 processes search requests by identifying and retrieving, from data repository 110, data objects that match criteria specified in the search request. These data objects are referred to herein as search results. Results identification component may be, for example, a conventional SQL query execution engine, a web search engine, search execution component 121, or any other suitable component for identifying and retrieving search results. Results ranking component 173, which assigns ranking scores to each search result, may be any suitable ranking mechanism, including a component similar or equivalent to subgraph ranking component 151. Results grouping component 174 and group ranking component 175 optionally divide the search results for each search request into different groups and rank those groups. Field scoring component 176 optionally analyzes the various fields of the identified results to identify the most relevant fields to present to the user. Display structure identifier 177 and rendering component 178 collectively generate presentations of the results that are then fed to search interface 171 for returning to clients 130.

The varying functions of each of the components of data server 170 are described in greater detail subsequent sections. An example information flow for communications between the components is depicted in FIG. 1B; however, many other information flows are also possible. Each of these components may be logically separate and distinct components, some or all of these components may be part of the same component, and/or the functionality performed by these components may be divided amongst other components. Various depicted components may be omitted from embodiment to embodiment. For example, in an embodiment where search results are returned directly to the client without additional rendering, components 176-178 may be omitted. As another example, in an embodiment where results identification component 172 only produces structured result sets, components 174 and 175 may be omitted.

Though not depicted, data server 120 or 170 may further include a variety of other components. For example, data server 120 or 170 may include data access components that communicate with data repository 110 via conventional I/O operations. Data server 120 or 170 may further include components such as an XML parser, state machine, or database server, if appropriate. Data server 120 or 170 may further include components such as a web server or application server. For example, data server 120 or 170 may utilize a web server to respond to search requests from one of clients 130. Some embodiments may include additional data servers 120 or 170, which in turn include their own copies or versions of some or all of the components described above.

As a practical matter, the use of a computer system in claimed embodiments is required. For example, data server 120 or 170 may be implemented by one or more computer systems executing collectively as a server. The components thereof may, for example, be implemented by one or more hardware processors of those one or more computer systems, configured to execute instructions for performing the various functions described herein. The techniques described herein should not be construed in any way as being amendable to being performed mentally or manually. Example computer systems that may be used to implement an embodiment include the computer systems described with respect to FIG. 10 and the servers configured to execute XAP applications described in U.S. patent application Ser. No. 12/782,591, entitled TYPE SYSTEM FOR BUILDING EXTENSIBLE BUSINESS APPLICATIONS, filed on May 18, 2010 by Eric Sedlar, et al., the contents of which are incorporated herein by reference for all purposes as if set forth in their entirety, and referred to hereafter as the XAP patent application.

3.0. Functional Overview—Unstructured Search

3.1. Search Request

Figure 2:
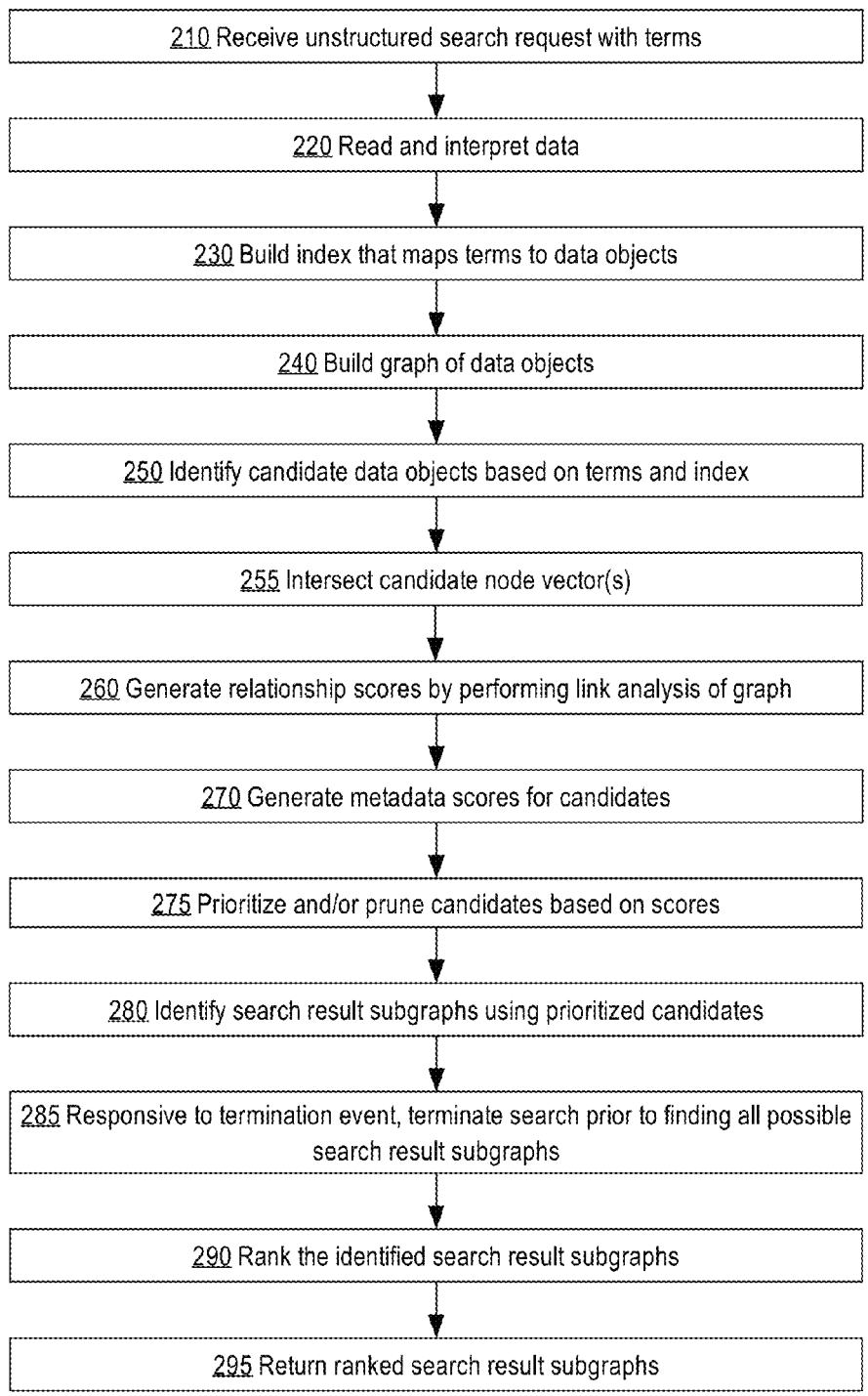
FIG. 2 depicts a flow for executing a keyword-based search for data objects.

FIG. 2 depicts a flow 200 for executing a keyword-based search for data objects, according to an embodiment. At block 210, a server receives an unstructured search request from a requestor. The search request comprises search criteria, including one or more terms (or "keywords"). The server may be any computing device, or component thereof, capable of performing a search on data objects such as data objects 111. For example, the criteria may be received by search execution component 121 of data server 120, or by a standalone indexing service that accesses a local data repository at a client computer. The terms may have been entered, for instance, via user input received at any suitable search interface presented by a client computer, such as one of clients 130. Or, as another example, the terms may have been provided programmatically from an application via an application programming interface. The terms may or may not be accompanied by other search criteria, including any of a variety of filters or search parameters supported by the search execution component.

3.2. Data Ingestion

At block 220, the server reads data structures from a data repository and interprets those structures as a collection of normalized data objects and/or metadata. The server may utilize, for example, ingestion component 122 to perform the reading and interpretation. For each data object or metadata item, the search execution component extracts constituent contents, tags, and/or links. The reading and extraction may involve, for instance, an XML parser and/or one or more queries.

In an embodiment, the server determines which data structures to read as metadata by searching for tables, documents, or document collections, in or external to the data repository, that have been marked as metadata. For example, the metadata may be in a designated system table or folder. Or, the metadata may be a collection of XML defined within a common namespace. The server interprets other data structures within the data repository as data objects.

The ingested data may include the entire set of data objects in a data repository. Or the ingested data may just be a subset of the available data, filtered by any of a variety of implicit or explicit search criteria, including without limitation permissions, identifiers, categorical information, type data, user groups, re-usability criteria, and so forth.

Though not required, in an embodiment the interpreted data objects are not necessarily entirely normalized. For example, the server may import certain normalized data objects into a referencing data object, thereby denormalizing (or "flattening") the referencing data object. Denormalization may be useful when it is known in advance that the data objects referenced by the object to be denormalized are not, by themselves, likely to be useful as search results. Various configuration rules, explicit attributes, search result usage logs, schema-based logic, search criteria, and so forth may instruct the server as to when the server should denormalize a given data object.

3.3. Indexing

At block 230, the server builds an index that maps data objects to terms associated with the interpreted data objects. The server may utilize, for example, indexing component 125 to perform the indexing. In an embodiment, the index is an inverted index in which each term is linked to a set of data objects. The terms linked to a particular data object are selected from the particular data objects's constituent contents and/or tags. In an embodiment, the indexed terms are selected only from content associated with certain fields or tags. For example, the indexed terms may be selected from content associated with descriptive tags, such as user-annotations, categorical information, labels, and names. In an embodiment, indexed terms may further be selected from certain types of related data objects.

The index may be built using any suitable indexing technique. For example, in one embodiment the data objects are transformed into a vector of indexable documents and composed into fields and values. Fields can be stored, indexed, or any combination thereof. To limit the amount of space used by the indexing, the number of indexed fields is minimized. The documents are then added to the inverted index.

3.4. Graphing

At block 240, the server generates a graph describing relationships between each of the interpreted data objects. The server may utilize, for example, a graphing component 123 to generate the graph.

As used herein, a graph is a description of a collection of items that has been optimized for the purpose of identifying relationships between those items during a link analysis of the collection. In an embodiment, a graph of a collection of data objects comprises, simply, a node for each data object and, for each particular node, one or more edges that each identify another node to which the particular node is related. However, the graph may comprise additional information as well. For example, edges or sets of edges may be associated with a relationship type indicator that indicates the type of relationship that exists between the source and destination nodes.

In an embodiment, the graph is stored entirely in-memory for fast traversal during a link analysis. However, the graph may also or instead be stored in other mediums. The graph may be stored in any suitable structures, including without limitation object collections, arrays, and/or hash tables. For example, the graph may comprise a top level array indexed to unique identifiers for each data object, with each particular element of the array comprising a separate second level array listing unique identifiers of the data objects that are related to the particular data object represented by the particular element.

Relationships

Block 240 may involve identifying the relationships between each interpreted data object so as to construct the edges of the graph. Depending on the embodiment, two data objects may be identified as related for any of a variety of reasons. In an embodiment, a data object is identified as being related to another data object if the data object explicitly links to the other data object. For example, an XML-based data object may explicitly reference an identifier of another data object in a href attribute, XLink, or other field. In an embodiment, a data object is identified as being related to another data object if the other data object is embedded within, inherits from, or is a container of the data object. In an embodiment, a data object is identified as being related to another data object if the data object is a state or type of the other data object. In an embodiment, a relationship may be discovered by following multiple links. For example, if a parent data object explicitly references a child data object, which in turn explicitly references its own child data object, the parent data object may be identified as related to the child's child by dependency even if the parent data object does not directly reference the child's child.

In an embodiment, each relationship is typed based on metadata associated with the link. Some examples of the many possible relationship types include "shipping address," "friend of," "employee of," "product," "business number," and so forth. Each type is not necessarily weighted equally. For example, a "previous address" type of relationship may be weighted much lower than a "current address" relationship type. Some types of relationships may not be included in the graph at all. In an embodiment, all identified relationships are weighted equally, and therefore need not necessarily be typed. In an embodiment, relationships are weighted based on popularity signals, such as the number of such relationships that exist in the database, click-through data from query logs, and/or the frequency with which a relationship is found in certain types of constructs, views, or queries.

In an embodiment, only relationships that indicate dependencies are graphed. That is, a data object is indicated as related to another data object only if the data object depends upon information in another data object. For example, the processing of a data object corresponding to a shipping order may depend upon information in a data object corresponding to a shipping address, but the inverse may not be true.

Directional Graph

In an embodiment, the edges in the graph are directional originating from a referencing object to a referenced object. For example, a parent data object that is required to have a child data object would have an edge to the child data object, but the child data object would not have an edge to the parent data object. As another example, a first data object that inherits data from second data object would have an edge to the second data object, but the second data object would not have an edge to the first data object.

Reverse Graph

In an embodiment, an algorithm for identifying search result subgraphs involves use of both the above-described directional graph (a "forward graph") and a reverse directional graph (a "reverse graph"). A reverse graph may therefore also be created as part of block 240, or at any other time before it is needed. In the reverse graph, the leaves of the forward graph become multiple roots of the reverse graph. For example, if the forward graph was A→B→C, the reverse graph would be C→B→A. In an embodiment, a separate reverse graph is created for each candidate node identified in block 250.

Metadata Graph

Embodiments involving metadata scoring, as subsequently described, may utilize a graph of metadata in addition to the graph of data objects. A graph of metadata may therefore also be generated as part of block 240, or at any other time before it is needed. The generation of a metadata graph, which is also described in the Metadata Application, may be performed in a manner similar to the generation of the data object graph.

3.5. Identifying Candidate Nodes

At block 250, the server identifies a set of candidate data objects, from the interpreted data objects, based on the search request. The server, or a candidate nominating component 124 thereof, utilizes the terms received in block 210 disjunctively to locate candidate items in the index of block 230, using any suitable information retrieval technique. For example, the server may look up each of the terms in the index, and add to the set of candidate items those data objects that are indexed under any of terms.

Terms may be single words or sets of words. In an embodiment, the search criteria may include conventional search directives to indicate whether a series of words in the search query are individual words, or a single term. In an embodiment, a dictionary lookup of indexed multi-word terms may be utilized to identify multi-word terms. Other techniques for identifying multi-word terms may also or instead be utilized, such as the spell-check and/or auto-complete techniques described below.

In an embodiment, the server may modify the set of terms before looking up candidate items, so as to eliminate terms not likely to be of interest, add additional terms of potential interest, correct spelling errors, and so forth. Example modification techniques are as follows.

Query Reformulation

Search requests are sometimes expressed using terms that are semantically similar to the terms found in the data objects, but nonetheless different. To account for semantic similarity, the search request may be reformulated by adding (or replacing terms with) synonyms, hypernyms, hyponyms, and so forth. In an embodiment, the terms may be further reformulated using a tagger implemented as a Hidden Markov Model or a Conditional Random Field, trained apriori to provide a part-of-speech tag to each query term. Desired parts-of-speech such as nouns or noun phrases may be located by calling into a WordNet index to apply the correct tense based on query expansion to the original terms in the query.

In an embodiment, the original terms and the reformulated terms may be used to retrieve two different sets of results. Results retrieved from the expanded query may be downweighted during the ranking of block 290 in comparison to results returned from the original query.

Spelling Correction

In an embodiment, terms for the search request may be automatically passed into a suitable spelling correction engine composed of a dictionary of terms and phrases used in the existing data objects. Misspelled words may be automatically replaced, or proper spellings may be added to the set of search terms. Spelling correction may further rely on the availability of query logs for highly relevant corrections. In the absence of query log information during a system bootstrap, a manually curated list of queries may be injected into the query log. For example, the list of candidate queries may be the titles of each data object. Each of these titles is treated as if it were a real query posed by a real user and injected at system bootstrap time into the spelling dictionary and the query logs. In an embodiment, a candidacy test is performed on terms that have been identified as misspelled. If those terms do in fact produce results within the collection of metadata, the terms may also be added to the dictionary.

Auto-Complete

In an embodiment, a query log index maintained for spelling correction may be further leveraged for providing suggestions for query completion. Auto-completion is an interactive process whereby a list of suggested query completions is continuously refined with each typed keystroke in the search box. If resources are available, results may also be provided based on the highest ranking suggestion. Query completions may be used to reduce the amount of typing activity and the rate of misspellings. They also serve as a quick preview into the available concepts or constructs in the metadata.

3.6. Intersecting Disjunctive Candidate Node Vectors

In an embodiment, a separate vector of candidate nodes is identified for each term in block 250. At block 255, the dimensionality of the search may be reduced by intersecting candidate node vectors to identify duplicate nodes. In an embodiment, when two different nodes produce intersecting nodes at a frequency above some minimum threshold, the candidate node vectors may be intersected entirely. In other words, any node that is only returned by one of the terms may be discarded altogether.

For example, in the query "Larry Ellison stock grants," it is certainly possible that the terms "Larry" and "Ellison" can appear separately inside data objects. But it is more likely that "Larry Ellison" was intended to be searched as a single term. By intersecting result vectors for these two terms, and optionally discarding nodes that only contain one of the two terms, the dimensionality of the algorithm in block 280 may be greatly reduced.

3.7. Link Analysis Scoring of Candidate Nodes

At block 260, the server performs a link analysis of the graph of block 240 to produce a relationship score for at least each candidate node. The link analysis may be performed by a component such as link analysis component 126. In an embodiment, the link analysis is configured to measure the relative importance of each item in a set of items, which in this case is the collection of data objects (or, in some embodiments, just the candidate set thereof). Data objects that are more heavily referenced within the metadata collection have higher scores than lesser referenced data objects. In an embodiment, the link analysis involves, in part, assigning weights to the edges (relationships) and nodes (data objects) in the graph, with a node's weight being proportional to that node's indegrees. The weights are then used to calculate a score reflecting the relative importance of each node.

Any technique or combination of techniques that return a score for items based on a graph may be utilized for the link analysis. Examples of algorithms for link analysis include, without limitation, Hyperlink-Induced Topic Search, PageRank, CheiRank, TrustRank, and variations thereof. For example, in an embodiment scores are calculated by executing an iterative or algebraic PageRank algorithm, such as described in L. Page, S. Brin, R. Motwani, and T. Winograd. The PageRank citation ranking: Bringing order to the web. Stanford Digital Libraries Working Paper, 1998, the entire contents of which are hereby incorporated by reference for all purposes as if set forth herein.

3.8. Metadata-Based Scoring of Candidate Nodes

At block 270, a metadata-based score is assigned for each of the candidate nodes. Metadata scoring may be performed, for instance, by a component such as metadata scorer 128. Each candidate node is associated with a corresponding metadata item that defines constraints upon the structure of the data object for which the candidate node was created. The metadata score for the candidate node is the score assigned to that node's corresponding metadata item.

In an embodiment, the metadata score for a given metadata item may be based on a link analysis of a metadata graph, similar to the link analysis of the data object graph. The link analysis is configured to measure the relative importance of each item in the metadata collection. Metadata items that are more heavily used (or reused) within the metadata collection have higher scores than lesser used metadata items. In an embodiment, the link analysis involves, in part, assigning weights to the edges and nodes in the graph, with a node's weight being proportional to that node's indegrees. The weights are then used to calculate a score reflecting the relative importance of each node.

In an embodiment, the metadata score is also or instead based on how often a given metadata item has been utilized in metadata joins for a specific type of construct. For example, some enterprise data systems feature user-defined constructs known as Sheets, which are essentially user-defined views of a variety of data objects that have been joined based on, for example, foreign keys. Candidate nodes that conform to certain metadata type might be ranked in proportion to the weights of their metadata constructs obtained by cross referencing the metadata link graph. This is done to capture implicit node authority in a link graph where some constructs may be more important than others and some edges (relationships) might be more important than others, thereby influencing ranking. For instance, candidate nodes that conform to metadata items that are more frequently pulled into Sheets and other such user-defined construct may be scored more highly than candidate nodes that are not.

Other techniques for scoring metadata items using a link analysis are described in the Metadata Application.

3.9. Prioritizing/Pruning Candidate Nodes

At block 275, the set of candidate nodes is ordered so as to prioritize nodes that are more likely to yield relevant search result subgraphs. In an embodiment, the server determines an order for the nodes that is based on a priority score. The priority score is a function of the scores determined in block 260 and/or block 270. The ordering may also or instead be based on term-based scoring of the nodes, such as a term-frequency score. The ordering may also or instead be based on a popularity-based scoring of the nodes, such as how often each node has been returned as part of a result set for a query, or how often each node has been a member of a search result subgraph that has actually been selected by a user in a search result listing. Popularity-based scoring may further be time-decayed so as to weight nodes that have been more recently popular higher. In an embodiment, each of the above factors may be assigned different weights when ordering the candidate nodes.

In an embodiment, block 275 involves pruning the candidate nodes to remove the lowest priority candidate nodes. For example, the priority score may also be compared to a priority threshold score. Those nodes scoring below the priority threshold score may be discarded. As another example, any node that is not within a top number of nodes in the ordering may be removed.

In an embodiment, pruning occurs separately from prioritizing, in that pruning is based on a different set of factors than the priority score. For example, a node's metadata score may determine whether the node should be pruned. Any remaining nodes may then be ordered in accordance with the relationship score (or any other suitable priority score). In an embodiment, pruning is performed alone, without the candidate nodes being placed in any prioritized order.

The ordering and/or pruning of the candidate nodes may be performed by, for instance, a component such as candidate prioritizer 127. In an embodiment, a prioritized ordering of the nodes takes the form of a queue, with the highest priority node at the head. However, other orderings are also possible.

3.10. Locating Search Result Subgraphs

At block 280, once the candidate nodes have been prioritized and/or pruned, the server utilizes the candidate nodes to locate one or more search result subgraphs that are responsive to the search request. The server may locate search result subgraphs, for example, using the subgraph identification component 129.

Search Result Subgraphs

A subgraph comprises a root node and one or more branches of descendant nodes. In the context of block 280, each subgraph is a subgraph of the graph computed in block 240. A search result subgraph is a set of related nodes that, for each particular term of the terms used to identify candidate nodes in block 250, contains at least one candidate node that was identified for that particular term. Put another way, a search result subgraph is a subgraph that includes at least a set of candidate nodes, the set comprising one candidate node from each candidate node vector produced by block 250.

The root node of the search result subgraph is, in the context of the forward graph computed in block 240, a common ancestor of the set of nodes. For example, consider a full name object A which has child objects for first name B and last name C. If B and C are candidate nodes, A would be, as the parent node of both B and C, a common ancestor of B and C. Therefore, A may serve as a root node of a search result subgraph, having B and C as its branches. In an embodiment, the root node for a search result subgraph is the closest common ancestor of a set of candidate nodes, but in other embodiments this need not always be the case. The root node is on many occasions not a candidate node itself, but may nonetheless also be candidate node.

The search result subgraph need not necessarily comprise each and every descendant of any given node in the subgraph. For example, if node A in the subgraph has branches for child objects B, C, and D, but only the B and C branches include candidate nodes, D need not be included in the search result subgraph (but optionally may be included).

Search Result Subgraph Identification Techniques

A number of techniques may be utilized to identify search result subgraphs. For example, a simple technique may be to identify each possible set of candidate nodes that includes at least one candidate node identified for each term in block 250. For each set, the server may traverse the graph upwards from each candidate node in the set until a common ancestor is found. A search result subgraph may then be constructed that includes the common ancestor and all nodes between the common ancestor and each candidate node in the set.

Many other suitable techniques may instead be utilized to identify search result subgraphs, including BANKS and BLINKS as described earlier in the application. Most of the techniques for search result subgraphs described thus far have been bottom-up, in that they start with candidate nodes and traverse the graph upwards looking for common ancestors. However, top-down techniques are also possible. For example, the server may iterate through each node of the graph of block 240 to determine whether the descendants of that node include candidate nodes from each candidate node vector. If so, the node and its branches is identified as a search result subgraph.

Another example technique is described in detail in Section 4.1.

Prioritizing Higher-Priority Candidate Nodes

In some embodiments, the search result subgraph identification process may be optimized to consider higher-priority candidate nodes ahead of lower-priority candidates, as determined in block 275. For example, some variations of the BANKS technique may maintain an ordered queue of candidate nodes to expand. The queue may be populated in a manner that favors expansion of higher-priority nodes ahead of lower-priority nodes. As another example, in the example technique where each possible set of candidate nodes is evaluated individually, examination of the sets may occur in an order that is at least partly based on the average candidate node priority score for each set. Other optimization strategies for higher-priority candidate nodes are also possible.

3.11. Termination Events/Constraints

In an embodiment, highly relevant search result subgraphs may be located relatively quickly by enforcing constraints upon the process of locating search result subgraphs. Based on these constraints, the server terminates the attempt to identify search result subgraphs prior to the server locating each and every possible search result subgraph, under the assumption that most or all of the highly-relevant subgraphs will already have been located. At block 285, then, in response to a termination event that reflects one or more of these constraints, the search result identification process is terminated without locating all possible search result subgraphs.

Early termination would conventionally yield result sets that are missing many or all relevant search result subgraphs, because not all search result subgraphs would have been considered. As a result of the prioritization and pruning of candidate nodes in block 275, however, the techniques described herein are much more likely to find the most highly relevant search result subgraphs first. Thus, the likelihood of missing highly relevant results upon early termination is greatly reduced. Early termination is optional, depending on the embodiment.

Maximum Depth

In an embodiment, the depth of a search result subgraph is constrained by a predefined maximum size. Because of this constraint, the server only needs to attempt to locate search result subgraphs whose root nodes are within a certain number of links to each candidate node in the subgraph. For example, in the bottom-up identification techniques described above, the server only needs to evaluate nodes within the predefined number of links from each candidate node as possible common ancestors. Evaluation for common ancestors may thus be terminated upon traversing to a node whose distance from a candidate node is greater than the predefined number. Reducing the maximum possible depth of a search result subgraph thus reduces the amount of nodes that need to be traversed in search for search result subgraphs.

A constraint on maximum depth may be imposed, for instance, based on search criteria and/or general configuration parameters reflecting assumptions about the likely usefulness of subgraphs of a certain size. In one embodiment, the maximum depth is 3, but other embodiments may feature different maximum depths.

For example, consider a graph in which nodes B and C have a common ancestor of A. The chain of nodes from B to A (i.e. the reverse graph) is B→D→E→F→G→A. The chain of nodes from C to A is C→A. The server would discover that A is a common ancestor as long as the maximum depth is 6 or more. However, if search result subgraphs are constrained to a maximum depth of 3, the server would terminate searching for search result subgraphs before discovering that A is a common ancestor. Nonetheless, depending on the nature of the data, A may be so distant from B that the connection of B to C via the common ancestor of A is not particularly interesting, and thus a subgraph based on node A would not be a very relevant search result. By limiting the maximum depth of the subgraph, the complexity of the search result subgraph process can thus be greatly reduced with minimal effect on the efficacy of the search results.

Maximum Number of Results

In an embodiment, the server only attempts to locate only a predefined number of search result subgraphs. The server maintains a counter of the number of search result subgraphs located thus far. When the counter passes a certain number, the search result subgraphs are returned to the user. In an embodiment, after the server has located the maximum number of search result subgraphs, the subgraph identification process may be terminated, thus greatly reducing the resources necessary to execute the search. In an embodiment, the subgraph identification process may continue either in the background while search result subgraphs are returned to the user, or upon a request from the user for additional search results.

In other embodiments, instead of a maximum number of results, a maximum amount of time is allocated to the search, and results are returned after the maximum amount of time elapses.

3.12. Ranking Search Result Subgraphs

The server may either return the search result subgraphs in the order they are discovered, or the server may re-rank the search result subgraphs before they are returned. In the latter case, at block 290, the server calculates a ranking score for each search result subgraph. The server may utilize, for instance, subgraph ranking component 151 to calculate the ranking. Any suitable ranking technique may be utilized. For example, in one embodiment, the ranking score is a combination of node weights (indegrees) and/or edge weights for each node in the search result subgraph. In another embodiment, the ranking score is simply a function of the number of nodes and/or the number of edges in the search result subgraph.

The server sorts the search result subgraphs based on their ranking scores. The server may do so, for instance, by comparing the ranking scores for each search result subgraph. In an embodiment, certain search result subgraphs may be discarded based on their scores. For example, search result subgraphs whose ranking score is below a pre-defined threshold score may be pruned. As another example, only a top predefined number of search result subgraphs may be returned. In some embodiments, however, search result subgraphs are returned in exactly the same order as they were identified.

In an embodiment, the ranking score is a combination of two or more of the scores described in blocks 260-275, computed for each node in the search result subgraph. In an embodiment, additional scores reflecting other relevance signals may also be incorporated into the ranking score. In an embodiment, only scores for certain nodes within a search result subgraph—for example, only the scores of the candidate nodes—are included when calculating a subgraph score.

In an embodiment, each score used to calculate the final ranking score is weighted as part of a parameterized ranking function. For instance, the relationship scores for each node in the subgraph may contribute more or less significantly to the ranking score than the node authority scores and/or the vector space scores. In an embodiment, the ranking score is $S(n)=Lambda(V(n))+(1-Lambda)*(P(n))$, where $S(n)$ is the combination score of a data object (or node–n), $V(n)$ is a vector space score of n, $P(n)$ is a relationship score of (n), and Lambda is a combination co-efficient that essentially weights $V(n)$ and $P(n)$. The combination score could either be additive of multiplicative.

In an embodiment weights are assigned by an expert, and modified throughout deployment as needed. In an embodiment, the weights are learned and/or relearned using any suitable machine learning mechanism, including without limitation linear regression algorithms, gradient descent algorithms, expectation-maximization algorithms, and/or Dynamic Bayesian Networks. The machine learning mechanisms may utilize, for instance, logs of search requests and corresponding click-through data for search results.

3.13. Returning the Result Set

At block 295, the server provides data indicating each search result subgraph in the result set to the requestor. The result set may be returned in a variety of forms, including XML, tables, web pages, and so forth. In an embodiment, the result set is returned in a web page comprising a flattened view of each search result subgraph of the result set, and further featuring controls for performing various actions with each search result subgraph, such as editing constituent data objects, locating related data objects, performing calculations on data within the search result subgraph, locating metadata related to data objects within the search result subgraph, and so forth. In an embodiment, the result set is returned as a list of data object identifiers, by which a client may look up and retrieve any information necessary to generate its own display of information about the data objects in each search result subgraph in the result set.

Specific examples of techniques for displaying results sets comprised of search result subgraphs are described, without limitation, in subsequent sections.

3.14. Variations

Flow 200 is but one example of a flow for executing searches using the described techniques. Other flows may feature fewer or additional elements, in varying orders. For example, some flows may omit the calculation of any of the scores determined in blocks 260-275. Generation of a graph that is separate from the data repository itself may also be optional in embodiments that omit the link analysis or perform the link analysis by traversing references in the data object collection directly. As another example, some or all of blocks 220-240, 260-270 may be performed at any time relative to the search request. For instance, the server may execute background processes for building indices and graphs in advance of the search request, and then cache the index and graph for use in any number of search results. The indices and graphs may be updated or rebuilt periodically or in response to trigger events, such as significant changes to the metadata. Depending on the resources available to the server, scores for blocks 260-275 and even portions of blocks 280-290 may also be performed in advance for quicker search request response time.

In an embodiment, other search criteria received in the initial search request may also affect the search. For example, the initial search request may specify constraints on the data objects that are searched, additional ranking factors, sort orders, and so forth.

In an embodiment, the server may push search result subgraphs to the requesting client as soon as they are located, with the client being configured to continually update a display of the search result subgraphs to include each newly located search result subgraph. In embodiments where the search result subgraphs are to be sorted by ranking scores, the server may include a ranking score with each new search result subgraph that is pushed to the client, or the client may calculate the ranking score for a search result subgraph itself. In either case, the client may continually sort the display of search result subgraphs based on the ranking scores as the subgraphs are received from the server. In an embodiment, the server may terminate such a search in response to termination events as described above. In embodiments, the server may terminate such a search in response to input from the user indicating that the user is done searching, such as an explicit instruction to stop the search or the user selecting to perform an action with respect to one of the search result subgraphs.

4.0. Implementation Examples—Unstructured Search

4.1. Example Search Result Subgraph Identification Flow

Figure 3:
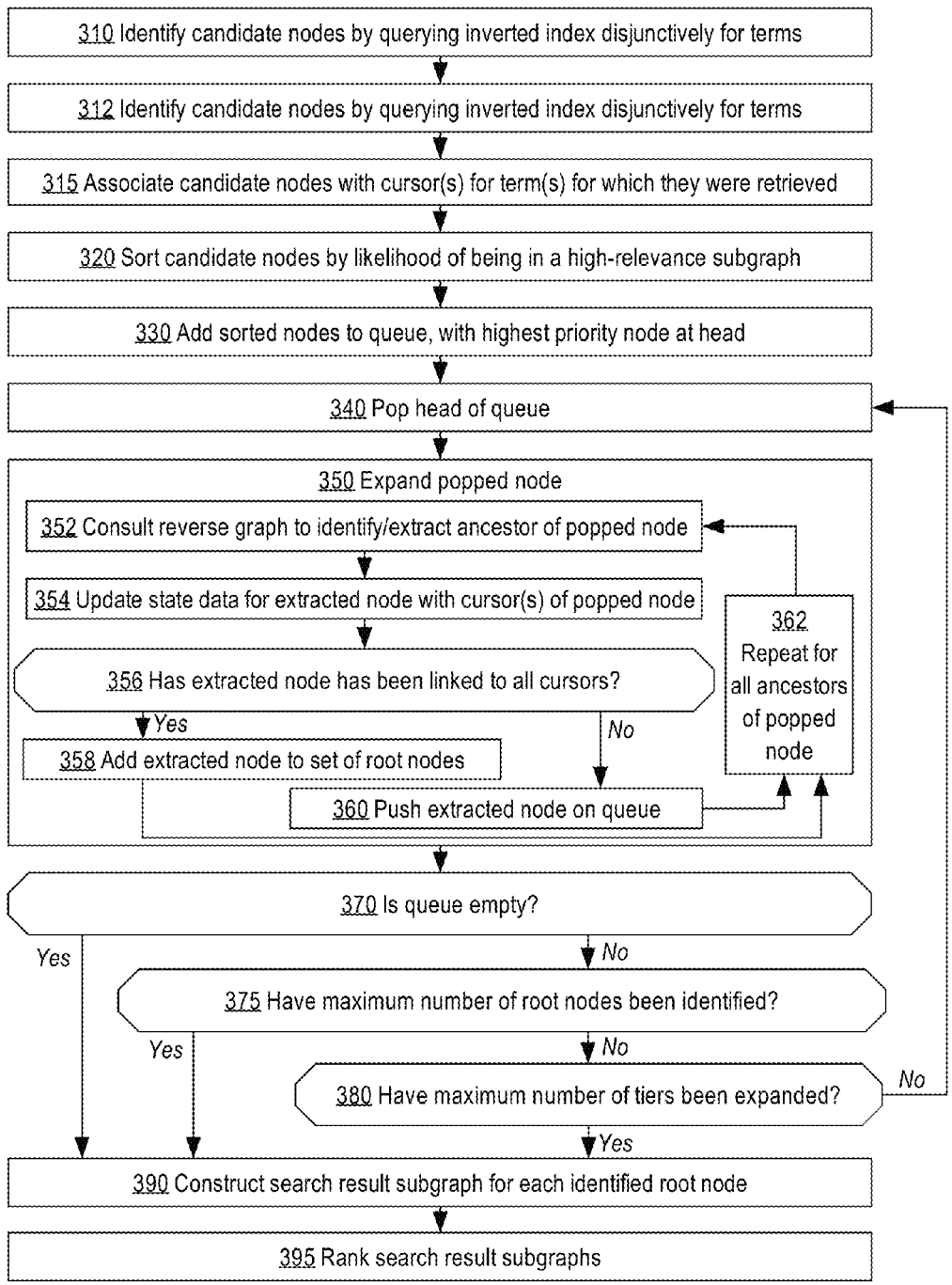
FIG. 3 is an example flow for identifying search result subgraphs.

FIG. 3 is an example flow 300 for identifying search result subgraphs, according to an embodiment. Flow 300 is an example of a technique that has been adapted for discovering subgraphs with higher-priority candidate nodes ahead of subgraphs for lower-priority candidate nodes. Flow 300 assumes that a data object graph and inverse index have already been built. Flow 300 further assumes that set of search terms has already been refined, if necessary, through query reformulation, spelling correction, and any other techniques that may be appropriate.

At block 310, for each search term of a multi-term query, a server queries the inverted index disjunctively to locate data objects whose contents or attributes include the search term. The server saves a list or other suitable structure of node identifiers indentifying each data object that was located. These node identifiers are candidate nodes, as in block 250 of FIG. 2.

At block 312, a cursor or other suitable structure is created for each search term. The cursors are used to track which nodes have been "visited" by which terms during graph traversal, so as to be able to recognize common ancestors of the candidate nodes.

At block 315, each node is associated with cursor(s) identifying the terms(s) for which the node was identified.

At block 320, the server sorts the nodes by their likelihood of being part of a highly relevant search result subgraph. This likelihood may be quantified, for example, using the priority score of block 275 in FIG. 2, or any other suitable score described in blocks 260-275. The server optionally prunes low-scoring nodes, as also described in block 275.

At block 330, the server adds each of the nodes to a queue for processing, in the order by which they were sorted in block 320, with the highest priority node at the head of the queue.

At block 340, the server pops the head of the queue.

At block 350, the server expands the popped node. Expansion comprises blocks 352-362.

At block 352, the server consults a reverse graph to identify an ancestor node (outlink) of the popped node.

At block 354, the server adds or updates state data associated with the extracted node, including data identifying the popped node and data linking the extracted node to the cursor(s) associated with the popped node.

At block 356, the server evaluates all state data associated with the extracted node to determine whether the extracted node has been linked to every search term cursor. If so, then the extracted node has been expanded for all search terms and is therefore a common ancestor to at least a set of candidate nodes comprising each of the search terms. At block 358, the extracted node is thus added to a set of root nodes for search result subgraphs. Flow then proceeds to block 362.

If, at block 356, the extracted node was not linked to every search term cursor, then at block 360 the extracted node is pushed on to the queue for future processing.

At block 362, blocks 352-360 are repeated for each ancestor node of the popped node, as indicated by the reverse graph.

At block 370, the server determines whether the queue is empty. If the queue is empty, flow proceeds to block 390. Otherwise, flow proceeds to block 375.

At block 375, the server compares the number of root nodes that have been identified for search results subgraphs to the maximum number of search result subgraphs to be returned. If the maximum number has been reached, flow proceeds to block 390. Otherwise flow proceeds to block 380.

At block 380, the server determines whether a maximum number of tiers has been expanded. If so, then any additional search result subgraphs that could be discovered would exceed the maximum depth. Flow thus proceeds to block 390. Otherwise, flow returns to block 340 to pop another node off the queue. The determination of block 380 may occur in a number of ways. For example, each node may be tagged with state data indicating a tier number, which is either 0 for the initial candidates, or 1 greater than that of the node from which a node was expanded. The current tier may be determined by examining the tier associated with the next node in the queue. Or, the current tier may be calculated by counting the maximum number of links in each chain of nodes from which the next node in the queue was expanded, if any.

At block 390, for each root node in the set of root nodes identified in block 358, the server constructs a search result subgraph. The search result subgraph comprises the root node and one or more branches to candidate nodes. The branches are created by evaluating the state data associated with the root node and recursively identifying the chain(s) of node(s) from which root node was expanded.

At block 395, each of the search result subgraphs is ranked, using, for instance, the factors described with respect to block 290.

Flow 300 is a very specific technique, and other suitable flows are possible that feature fewer or additional steps in varying order. As one example of the many possible variations, in an embodiment, a stack or a priority queue may be used instead of a queue, resulting in the nodes pushed during the expansion being considered before nodes already in the queue. As another example, subgraphs may be reconstructed and/or ranked as the are found, in parallel with node expansion. As another example, block 375 may be performed immediately after each new root node is discovered.

Example pseudo code for a technique similar to flow 300 is as follows:

```
Q ← S; Q ← Ø
X ← K(t);
Max_tiers = 3;
GRAPH-SEARCH( )
1 for each keyword term t
2    X(t) ← query the inverted index disjunctively, save results
3 Sort each X(t) in decreasing order of node pagerank (PR)
4 Add each node from each X(t) to the queue (Q)
5 while Q is not empty and number of tiers expanded < Max_tiers
6 Pop the head of the queue N ← pop(Q)
7 push(Q) ← EXPAND(N)
9 END
EXPAND(N)
1 OL(N) ← consult the reverse graph and retrieve (outlinks) linked
  nodes from N
2 add metadata to each of the extracted nodes (tier, node_id,
  parent_id, cursor(term pos in original query))
3 for each node X in OL(N)
4    if not CHECK_TERMINATION(X)
5      push (Q) ← X
CHECK _TERMINATION(X)
1 if X was visited by all cursors
2    RANK(X)
3 create a search result tree SRT
4 set root node of SRT ← X
5 create size_of(K) ordered lists to track paths from root to leaf in
  SRT
3 add(S) ← COMPUTE_TREE(X)
4 return TRUE
5 else
6  return FALSE
COMPUTE_TREE(X)
1
1 for each parent p(x) : X
2 if p(x) is not null
3    SRT.get(ordered_list for p(x)'s cursor).add(p(x))
3    COMPUTE_TREE(p(x))
4 else
5 return
```

4.2. Walk-Through for Example Technique

The following example data objects may be utilized to illustrate the application of the techniques described herein on a small data repository. Data object 1 is an "Order" object, having the fields product_id=110 and customer_id=220. Data object 2 is a "Product" object, having the fields product_id=110 and product_name=laptop. Data object 3 is a "Customer" object, having the fields customer_id=220 and customer_name=John Doe.

An inverted index may be generated based on these data objects as follows:

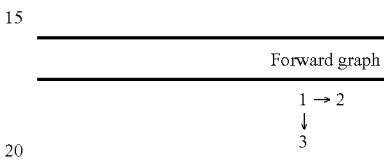

| (Terms) | ← (Data object ids) |
|---|---|
| customer | ← 1, 3 |
| doe | ← 3 |
| ...... | |
| ..... | |
| john | ← 3 |
| laptop | ← 2 |
| order | ← 1 |
| product | ← 1,2 |

A forward graph would be generated as follows:

| Forward graph |
|---|
| 1 → 2 |
| ↓ |
| 3 |

A reverse graph would be generated as follows:

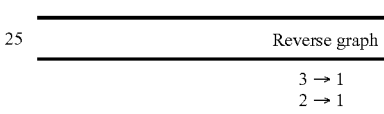

| Reverse graph |
|---|
| 3 → 1 |
| 2 → 1 |

Upon receiving the sample query: "order john laptop," inverted index lookups would be performed for each of "order," "john," and "laptop." Candidate data objects (nodes) would thus be identified as follows: order←1, john←3, laptop←2.

Document 1 does not contain the words john or laptop, but contains order. Documents 3 and 2 contain the other 2 terms in the query. By consulting the reverse graph and expanding nodes 3 and 2 out to node 1, it becomes clear that node 1 is a root node for a search result subgraph. In this particular case, the subgraph is the same as the forward graph. Of course, with larger data sets, each search result subgraph would likely be but a small excerpt from the forward graph.

4.3. Example Data Object Graph

Figure 4:
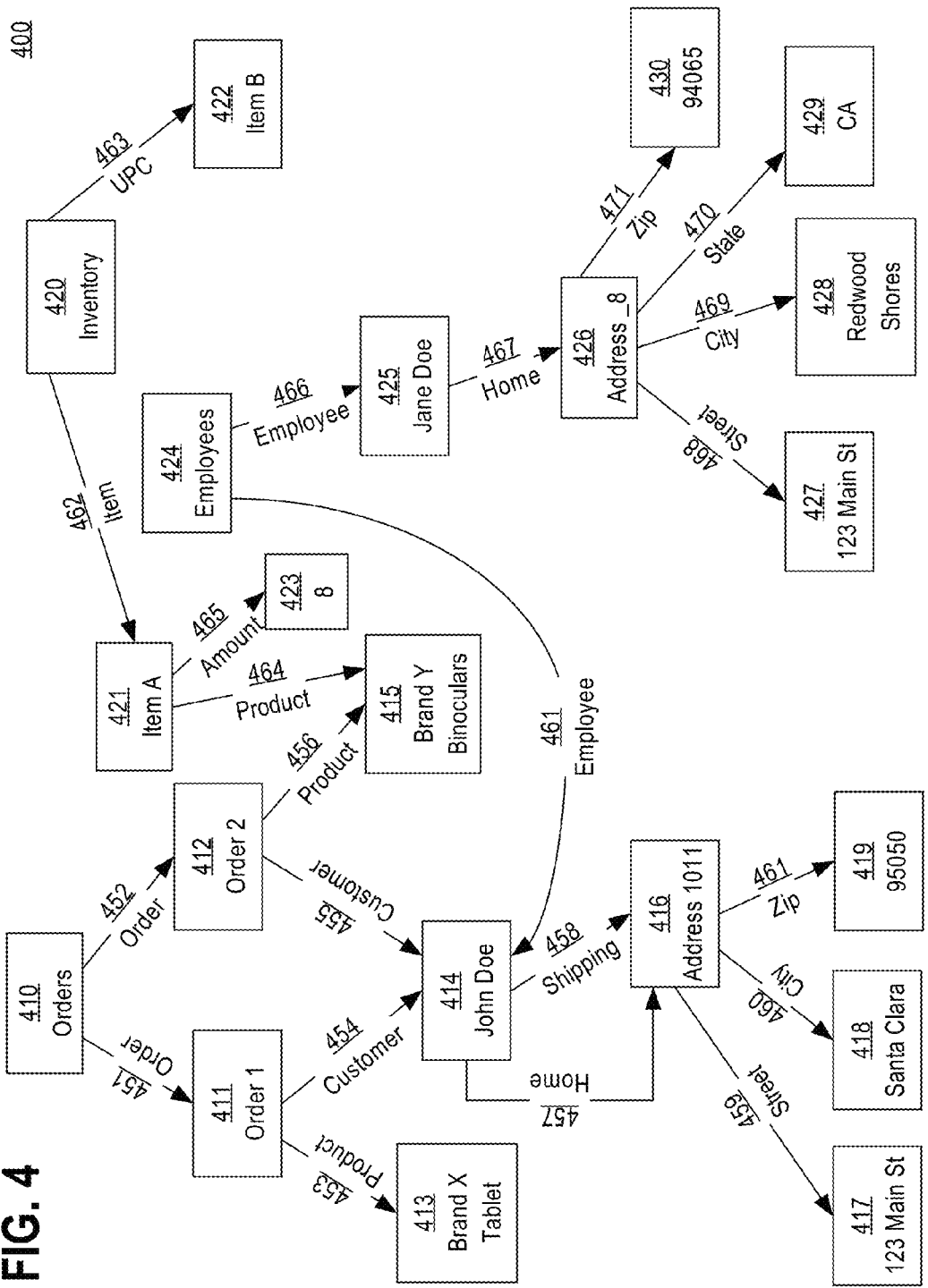
FIG. 4 is a block representation of a graph of normalized data objects.

FIG. 4 is a block representation of a graph 400 of normalized data objects, in accordance with an embodiment of the invention. FIG. 4 comprises a plurality of nodes 410-429 and a plurality of edges 451-471. Each of nodes 410-429 represents a searchable data object in a repository of metadata items. Each of edges 451-471 represents a dependency relationship of nodes 410-429. Graph 300 is not necessarily a complete graph of a data repository, but rather illustrative of the graphing techniques described herein.

For example, node 414, labeled "John Doe," is indicated by the directional arrow of edge 454 to have a "Customer" relationship with node 411, labeled "Order 1." Node 411 is accordingly dependent upon node 414. Similarly, node 426, labeled "Address_8," is indicated by the directional arrow of edge 467 to be a "Home Address" of node 425, labeled "Jane Doe." Node 425 is accordingly dependent upon 426.

Link Analysis of Graph

In an embodiment, a simple link analysis of graph 400 would produce a relationship score for each node 410-429 that is equal to the number of edges 451-471 that are directed into the node. For instance, John Doe node 414 has three edges 454, 455, and 461 that are directed into it. John Doe node 414 would thus have a relationship score of 4. Meanwhile, "Jane Doe" node 425 would only have a relationship score of 1, since only edge 466 is directed into it. All other factors being equal, then, a search involving the term "Doe" would prioritize node 414 ahead of node 425.

In other embodiments, more complex link analyses would produce different relationship scores for each node. For instance, in an embodiment, each node begins with an equal relationship score, and the link analysis involves iteratively transferring a portion of each node's relationship score to all nodes that the node transitions into. In an embodiment, the relationship score for each node is also a function of weights assigned to the different types of edges leading into the node. For example, relationship types of "Employee," as shown in edge 466 may be used much more frequently in queries and views of data in the data repository than relationship types of "Customer," as shown in edge 455. Scores transferred over edge 466 may therefore be weighted much higher than scores transferred over edge 455.

Example Search Result Subgraphs

A search for the terms "John Tablet 95050" would yield three candidate nodes—nodes 413, 414, 419. Since node 411 is the common ancestor of each of these candidate nodes, a search result subgraph for such a query could include nodes 411, 413, 414, 416, and 419.

A search for the terms "Doe Main St" would yield candidate nodes 414, 417, 425, and 427. Based on these candidate nodes, two different subgraphs would be located, having roots at 414 and 425. However, since node 414 would likely have the highest priority in view of node 414 having the highest indegrees (which usually translates to a higher relationship score), the subgraph rooted at 414 would be discovered first.

A search for "Jane Binoculars" would yield two candidate nodes 415 and 425. However, since the nodes do not have a common ancestor, no result would be returned.

A search for 95050 and 94065 would yield two candidate nodes 419 and 430. The Employees node 424 is a common ancestor node of these two nodes. In an embodiment, however, a maximum depth could be imposed, such as 3, which could result in employees node 424 not being found.

4.4. Example Metadata Graph

Figure 5:
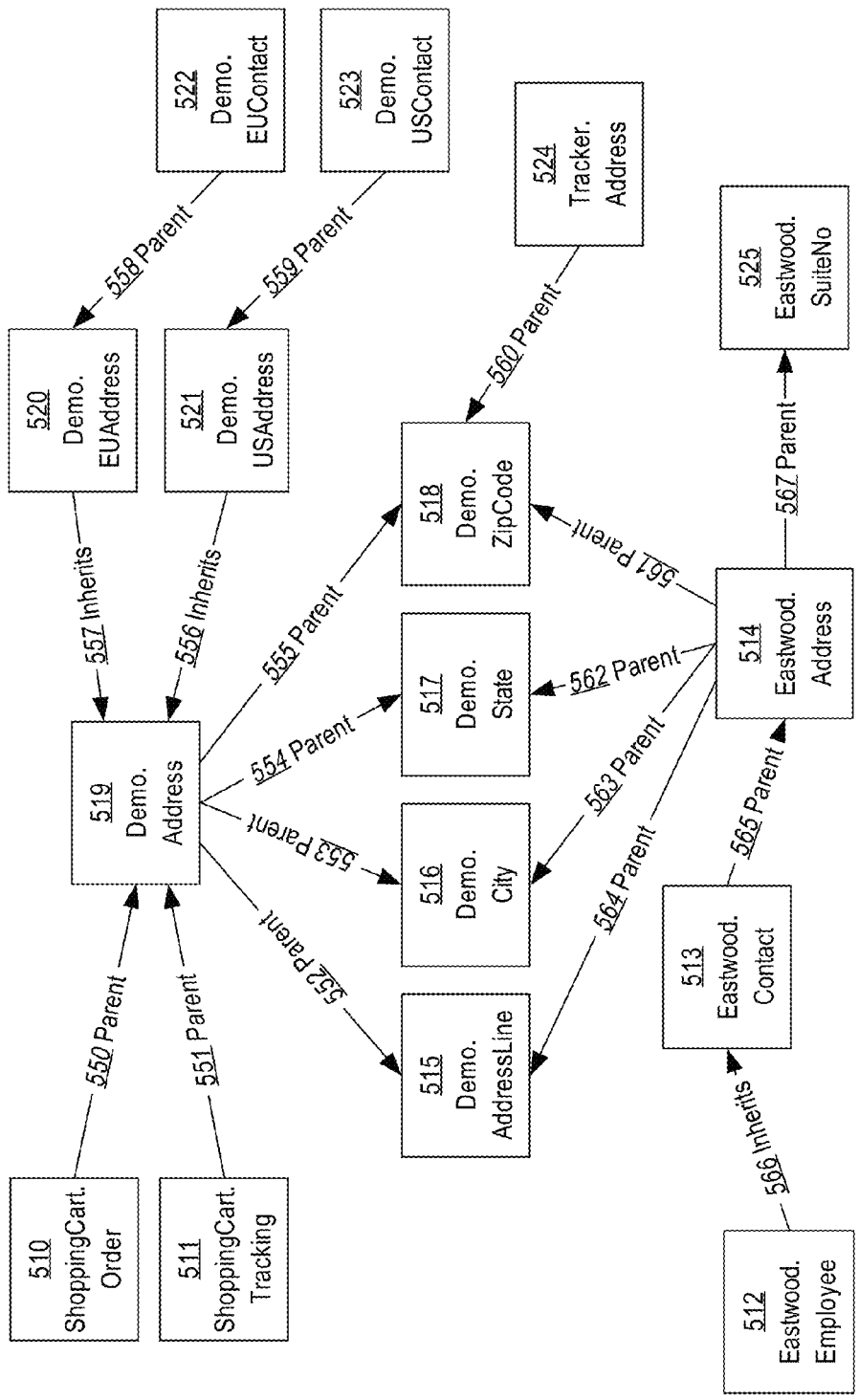
FIG. 5 is a block representation of a graph of metadata items.

FIG. 5 is a block representation of a graph 500 of metadata items, in accordance with an embodiment of the invention. FIG. 5 comprises a plurality of nodes 510-525 and a plurality of edges 550-567. Each of nodes 510-525 represents a metadata item in a repository of metadata items. Each of edges 550-567 represents a dependency relationship of nodes 510-525. Graph 500 is not necessarily a complete graph of a metadata collection, but rather illustrative of the graphing techniques described herein.

For example, node 519, labeled "Demo.Address," is indicated by the directional arrow of edge 553 to have a "Parent of" relationship with node 516, labeled "Demo.City," and is accordingly dependent upon node 516. Similarly, node 514, labeled "Eastwood. Address," is indicated by the directional arrow of edge 563 to be a "Parent of" node 516, and is accordingly also dependent upon node 516. As another example, node 520, labeled "Demo.EUAddress" is indicated by the directional arrow of edge 557 to have an "Inherits From" relationship with node 519, labeled "Demo.Address," and is accordingly dependent upon node 519.

In an embodiment, a simple link analysis of graph 500 would produce a relationship score for each node 510-525 that is equal to the number of edges 550-567 that are directed into the node. For instance, Demo.Address node 519 has four edges 550, 551, 558, and 559 that are directed into it. Demo.Address node 519 would thus have a relationship score of 4. Meanwhile, Eastwood.Address node 514 would only have a relationship score of 1, since only node 565 is directed into it. All other factors being equal, then, a data object constrained by the metadata represented by the Demo.Address node 519 would be ranked ahead of a data object constrained by the metadata represented by the Eastwood.Address node 514.

In other embodiments, more complex link analyses would produce different relationship scores for each node. For instance, in an embodiment, each node begins with an equal relationship score, and the link analysis involves iteratively transferring a portion of each node's relationship score to all nodes that the node transitions into. In an embodiment, the relationship score for each node is also a function of weights assigned to the different types of edges leading into the node.

4.5. Example Metadata and Data

According at an embodiment, metadata for a repository such as data repository 110 may be specified using an XML syntax set forth within a namespace known as XAP, as discussed in the XAP patent application. The XAP syntax comprises three main constructs: an element construct, a type construct, and a state construct. As an example, the metadata item corresponding to the Demo.Address node 519 of graph 300, depicted in FIG. 5, may be an element construct described by the following XML:

```
<xap:element xmlns:xap="http://xap.oracle.com" xap:docid="A6"
    xap:id="__0">
<xap:name xap:id="__1">address</xap:name>
<xap:uri xap:id="__2"> http://xap.oracle.com/demo</xap:uri>
<xap:label xap:id="__3">Address</xap:label>
<xap:defaultType xap:href="/xap/sys/get?docid=B3" xap:id="__4"/>
<xap:description xap:id="__5">A address has the following fields : -
    addressline - city - state - zipcode</xap:description>
</xap:element>
```

Among other aspects, the various tags, attributes, and contents of the above description provide the Address metadata item with a name ("address"), namespace ("http://xap.oracle.com/demo"), and a description ("A address has the following fields:—addressline—city—state—zipcode"). The "xap:defaultType" tag further provides a type definition of the internal structure to expect, by default, from any data object conforming to this metadata item. In this particular case, the type definition is provided by way of an "xap:href" attribute, which is a reference to type construct having an internal identifier of "B3." The type construct B3 is therefore said to have a "Type Of" relationship with the element construct set forth above.

An XML description of the B3 type construct may be as follows:

```
<xap:type xmlns:xap="http://xap.oracle.com" xap:docid="B3"
    xap:id="__0" xap:states="104">
<xap:name xap:id="__1">Address</xap:name>
<xap:uri xap:id="__2">http://xap.oracle.com/demo</xap:uri>
```

```
<xap:elementRef xap:href="/xap/sys/get?docid=A6" xap:id="_3"/>
<xap:defaultState xap:href="/xap/sys/get?docid=BA" xap:id="_4"/>
<xap:label xmlns:xap="http://xap.oracle.com" xap:id="_9">Address
        </xap:label>
</xap:type>
```

The above XML description provides a variety of information similar in nature to that set forth in the element construct for the Address metadata item. Of further interest, the "xap:elementRef" tag may be used to provide backwards relationship information by which element constructs that refer to the type construct may be located. The "xap:defaultState" tag further provides a description of a default state for constraints that should be applied to any data object conforming to the type construct. The state definition is provided by way of reference to a state construct having an XAP identifier of "BA." A "State Of" relationship is therefore established between the B3 type construct and the BA state construct.

An XML representation of the the BA state construct may be as follows:

```
<xap:state xmlns:xap="http://xap.oracle.com" xap:docid="BA"
        xap:id="_0">
    <xap:name xap:id="_1">Address</xap:name>
    <xap:uri xap:id="_2">http://xap.oracle.com/demo</xap:uri>
    <xap:typeRef xap:href="/xap/sys/get?docid=B3" xap:id="_3"/>
    <xap:constraint xap:id="_4">
    <xap:subelement xap:id="_5"><xap:elementRef
            xap:href="/xap/sys/get?docid=92"
            xap:id="_6"/></xap:subelement>
    </xap:constraint>
    <xap:constraint xap:id="_7">
    <xap:subelement xap:id="_8"><xap:elementRef
            xap:href="/xap/sys/get?docid=93"
            xap:id="_9"/></xap:subelement>
    </xap:constraint>
    <xap:constraint xap:id="_10">
    <xap:subelement xap:id="_11"><xap:elementRef
            xap:href="/xap/sys/get?docid=94"
            xap:id="_12"/></xap:subelement>
    </xap:constraint>
    <xap:constraint xap:id="_13">
    <xap:subelement xap:id="_14"><xap:elementRef
            xap:href="/xap/sys/get?docid=95"
            xap:id="_15"/></xap:subelement>
    </xap:constraint>
</xap:state>
```

The above XML description provides a variety of information similar in nature to that set forth in the previous element and type constructs. Of further interest, the "xap:constraint" tag is used four times to specify constraints for data objects when in the state specified by the BA construct. In particular, four "xap:subelement" constraints are defined, describing children nodes that are to exist when the data object is in the state specified by the BA construct. The children nodes are described by references to yet other element constructs, thereby establishing "Subelement of" relationships between the BA state construct and each of the other element constructs.

The required child nodes of data objects that conform to the Address metadata item, while in the default type and state, may be described by the following XML representations:

```
<xap:element xmlns:xap="http://xap.oracle.com" xap:docid="92"
        xap:id="_0">
    <xap:name xap:id="_1">addressline</xap:name>
    <xap:uri xap:id="_2">http://xap.oracle.com/demo</xap:uri>
    <xap:label xap:id="_3">AddressLine</xap:label>
    <xap:datatypeRef xap:href="/xap/sys/get?docid=82" xap:id="_4"/>
    <xap:description xap:id="_5">The address line.</xap:description>
</xap:element>
<xap:element xmlns:xap="http://xap.oracle.com" xap:docid="93"
        xap:id="_0">
    <xap:name xap:id="_1">city</xap:name>
    <xap:uri xap:id="_2">http://xap.oracle.com/demo</xap:uri>
    <xap:label xap:id="_3">City</xap:label>
    <xap:datatypeRef xap:href="/xap/sys/get?docid=82" xap:id="_4"/>
    <xap:description xap:id="_5">The city name in
        address.</xap:description>
</xap:element>
<xap:element xmlns:xap="http://xap.oracle.com" xap:docid="94"
        xap:id="_0">
    <xap:name xap:id="_1">state</xap:name>
    <xap:uri xap:id="_2">http://xap.oracle.com/demo</xap:uri>
    <xap:label xap:id="_3">State</xap:label>
    <xap:datatypeRef xap:href="/xap/sys/get?docid=82" xap:id="_4"/>
    <xap:description xap:id="_5">The state name in
        address.</xap:description>
</xap:element>
<xap:element xmlns:xap="http://xap.oracle.com" xap:docid="95"
        xap:id="_0">
    <xap:name xap:id="_1">zipcode</xap:name>
    <xap:uri xap:id="_2">http://xap.oracle.com/demo</xap:uri>
    <xap:label xap:id="_3">Zipcode</xap:label>
    <xap:datatypeRef xap:href="/xap/sys/get?docid=82" xap:id="_4"/>
    <xap:description xap:id="_5">The zip code in
        address.</xap:description>
</xap:element>
```

The above XML sets forth definitions for the metadata items "AddressLine Element," "City Element," "State Element," and "Zipcode Element," corresponding to nodes 515-518 of graph 500. These elements are scalar data type elements, subject to the constraints imposed by yet another metadata item, having the XAP identifier of 62, which is not described herein, but corresponds to simple strings.

An XML representation of a single data object that conforms to the constraints set forth by the above metadata items is as follows:

```
<?xml version="1.0" encoding="UTF-8"?>
<demo:address xmlns:demo="http://xap.oracle.com/demo"
        xmlns:xap="http://xap.oracle.com" xap:docid="E6"
        xap:id="_0" xap:states="174">
    <demo:address xap:id="_8" xap:states="172">
    <demo:addressline xap:id="_9">123 Main St.</demo:addressline>
    <demo:city xap:id="_10">Redwood Shores</demo:city>
    <demo:state xap:id="_11">CA</demo:state>
    <demo:zipcode xap:id="_12">94065</demo:zipcode>
    </demo:address>
```

A normalized version of such a data object is graphed in FIG. 4, beginning at node 426. An XML parser would recognize that the above data object is to conform to the above metadata using the reference to the namespace set forth by the "xmlns:demo" attribute of "demo:address" and the reference to specific element construct definitions set forth by each tag's name.

In an embodiment, some or all of the information in the above XML definitions of metadata items may be subject to a indexing, per the techniques described herein. In an embodiment, only "description," "name," and "label" may be indexed. In an embodiment, a search is only performed on element constructs, and thus only element constructs are indexed. Relationships between element constructs, such as "Child of," "Descendent of," and "Parent of" may be derived from following references from one element construct to another element construct. However, metadata searching need not be limited to any particular type of construct or any particular type of relationship.

The above example is but one way that data and metadata may be represented. A variety of other representations are also possible, including other XML-based representations. Other kinds of relationships and constraints may also be defined using any suitable technique.

5.0. Functional Overview—Presenting Search Results

In an embodiment, rather than provide a client with the actual data objects that match the client's search criteria (i.e. the search results), the server instead provides the client with a search report comprising one or more views of each search result. A "view" of a search result is a presentation based on some or all of the data embedded within the search result data object. The view may comprise extracted data that is presented in the exact same form as that data was stored or indexed, derived data that is determined based on algorithms or functions of the extracted data, and/or excerpts of either extracted data or derived data. In an embodiment, each view of a search result is a row in a table comprising columns that represent various fields of the search result. However, in other embodiments, search result views may be formatted as other structures such as trees, graphs, three-dimensional structures, and so forth.

Figure 6:
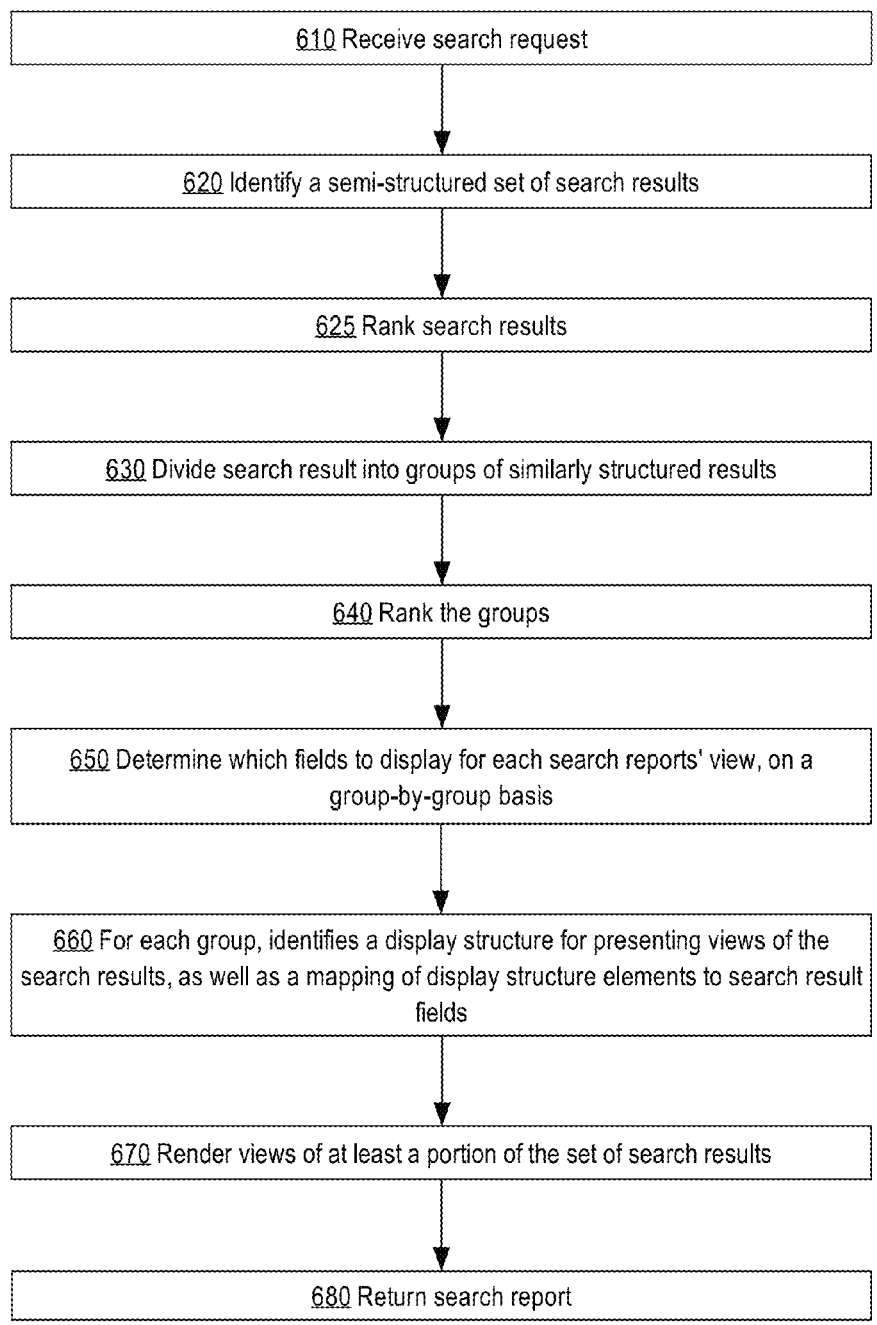
FIG. 6 depicts a flow for presenting a search report for a semi-structured set of search results.

FIG. 6 depicts a flow 600 for presenting a search report of views for a semi-structured set of search results, according to an embodiment. Flow 600 may be used, for example, in conjunction with flows 200 or 300 to present views of search result subgraphs returned from an unstructured search. Flow 600 or similar flows may also or instead be used to present data objects identified via other mechanisms, including requests for data other than search requests.

5.1. Identifying Search Results

At block 610, a server receives a search request from a requestor. The search request comprises search criteria, including one or more terms (or "keywords"). The server may be any computing device, or component thereof, capable of performing a search on data objects such as data objects 111. For example, the criteria may be received by search interface 171 of data server 170, a standalone indexing service that accesses a local data repository at a client computer, a relational database server, and so forth. The terms may have been entered, for instance, via user input received at any suitable search interface presented by a client computer, such as one of clients 130. Or, as another example, the terms may have been provided programmatically from an application via an application programming interface. The terms may or may not be accompanied by other search criteria, including any of a variety of filters or search parameters supported by the search interface. In an embodiment, the search request is an unstructured query such as described in the previous section. In an embodiment, the search request is a structured query, such as a query conforming to a database language such as SQL.

At block 620, the server identifies a semi-structured set of search results responsive to the search request. The server may perform block 620, for instance, using results identification component 172 of server 170 or components 121-129 of server 120. The server may utilize any suitable search technique that produces a semi-structured set of search results. For example, without limitation, the server may perform any of the search techniques mentioned in this application, including the method of flow 200, other graph-based or candidate network-based techniques, conventional SQL processing techniques, and so forth. In an embodiment, the semi-structured set of search results is a collection of search result subgraphs. However, in other embodiments the set of search results is not limited to any particular form.

At block 625, the server optionally ranks the set of search results by, for example, sorting the results in accordance with suitable ranking criteria and/or assigning a ranking score to each search result. The server may perform block 625 using, for instance, ranking component 151 of sever 120 or ranking component 173 of server 170. The ranking of a result may occur at any time after the result has been identified, up until the time the result is finally rendered as a view at the client.

5.2. Identifying Groups of Similarly Structured Search Results

At block 630, the server identifies groups of similarly structured search results, thus dividing the set of search results into one or more structured subsets. The server may perform block 630, for instance, using results grouping component 174. In an embodiment, block 630 comprises identifying the structure of each search result. For example, the server may identify the structure for a search result by looking up one or more schema definitions for the result's constituent data object(s) and/or analyzing the search result to identify structural components such as attributes, columns, subelements, and so forth. For convenience, the structural components of a search result are collectively referred to as fields of the search result, or result fields. The identified structures are compared. Those search results that have common structures are grouped together.

In an embodiment, the server identifies groups of search results that do not conform to exactly the same structure, but nonetheless conform to structures of sufficient similarity that they may be displayed using a same display structure. The server may utilize any of a number of criteria for identifying search results that are of sufficient similarity to be displayed using a same display structure. For example, a first search result may consist of fields that are structured exactly the same as the fields of a second search result, except that the first and second search results name their fields differently. Such may be the case, for instance, if the first and second search results each include columns that conform to a common address type definition, but conform to different metadata elements that label the column differently (e.g. USAddress as opposed to Address). The first and second search results may thus be grouped together.

As another example, two different results may conform to fairly different structures, but the highly relevant fields of those structures, as identified in block 650 or via the techniques of flow 700, may be the same. The different results may thus be grouped together, as long as only the highly relevant fields are depicted. As another example, a first search result and a second search result in a structured set may be structured exactly the same except in that they include links to different types of subelements. As long as the server will be rendering these subelements as links as opposed to views of the actual values inside of these subelements, the first and second search result may be grouped together. As another example, a first search result and a second search result may be the same except for the fact that the first search result includes a first component while the second search result includes a different second component. However, the first search result and the second search result may be considered to be similarly structured if the first component and second component descend from a common ancestor component.

Other criteria and/or combinations of the above criteria may also be utilized to identify search results as being sufficiently similar for grouping purposes.

The server may utilize groups of "sufficiently similar" search results for the same purposes as groups of search results that have exactly the same structure. For convenience, this disclosure may thus refer to both groups as being "structured sets" or "structured groups." This disclosure should be understood as teaching that any technique described as being performed with respect to a structured set of search results is also equally applicable to a group of similarly structured search results.

Depending on the nature of the search request and the data being search, a server may return any combination of structured, unstructured, and semi-structured sets of search results. For such a server, the processing of a search result set may be conditioned upon how many groups are identified in block 630. If only one group is identified, the entire set is processed as a single structured set of search results. If no groups of two or more search results are identified—or, in an embodiment, if more than a threshold number of groups of search results are identified—the entire set of search results may be flattened and presented using techniques for unstructured sets of search results.

5.3. Ranking the Groups

At block 640, the server optionally ranks the different groups of search results that were identified in block 630, relative to each other. The server may perform block 640 using, for instance, group ranking component 175. The server may employ a variety of scoring mechanisms to determine a score for each group. For example, the score for a group may be the average, sum, or other statistical function of individual ranking scores for each search result in the group. Individual ranking scores may have been determined via any suitable technique, including those described herein. As another example, the score for a group may be based on the number of members that belong to the group, or a weight defined for metadata associated with the group.

Once a score has been determined for each group, the groups may be sorted in an order based on their scores. The groups will then be displayed in this order to the user.

5.4. Deciding Which Fields to Display

At block 650, the server optionally determines which fields to display for each search reports' view, on a group-by-group basis. That is, in an embodiment, views may omit data for certain fields of certain search results. The omitted fields are the same for each search result in a group. The server may perform block 650 using, for instance, field scoring component 176. The server may choose to omit fields for a group, for instance, as a result of determining that certain columns or nodes of data are not likely to be relevant or useful to the user. For example, each search result in one group may have on the order of hundreds or thousands of columns. Many of those columns may be omitted because they contain predominantly null values or other information that is not likely to be useful to the user. The server may therefore omit these columns in any view for the search results in the group.

In an embodiment, the determination of which fields should be included in the views for a group involves identifying fields that are highly likely to be relevant, such as highly descriptive or uniquely identifying columns, and then excluding other fields. Techniques for identifying such fields are described, for instance, beginning with block 730 of flow 700.

In an embodiment, rather than or in addition to omitting low relevance fields, highly relevant fields are emphasized using highlighting or other techniques. In an embodiment, a determination of which fields to display is only necessary if the search results are of a threshold complexity—e.g., if the search results have more than a threshold number of fields.

5.5. Identifying Group Display Structures

At block 660, for each group, the server identifies a display structure for presenting views of the search results, as well as a mapping of search result fields to display structure elements. A display structure governs the format of the view used to present a search result. Each view of a search result in a group is formatted using a display structure that is common to the group. Thus, the server identifies display structures on a group-by-group basis. The server may perform block 660 using, for instance, data structure identifier component 177. Both the display structure and the mapping are based upon the common structure to which each search result in the group conforms, and thus may vary from group to group. However, the display structure may be different from the common structure. For instance, if the server determined to omit any fields in block 650, that determination is taken into consideration when identifying the display structure. In an embodiment, the display structures is generated dynamically at the time of preparing the search request rather than being pre-defined, thus allowing for the presentation of search results having any arbitrary structure.

For example, for a group comprised of search result data objects that are rows, arrays, or otherwise non-hierarchical collections of values, the server may determine that each data object is to be displayed in a row-based structure in which each result field is mapped to a column of the row. Each row constitutes a search result view, and the rows for the group collectively form a group table. Each column may be labeled with a name based on the common structure or schema for the group.

As another example, for groups whose search result data objects are hierarchical collections of data, such as multi-level search result subgraphs, the server may also determine that each data object is to be displayed in row-based structures. The values at each leaf of a search result subgraph may be mapped to a separate column in the row-based structure. The row-based views of the search result subgraphs are pooled together for the group to collectively form a group table. To retain additional structural details, values for nodes that are nested within in parent nodes may be displayed in a subdivided column with a column for the parent node. This subdivision may be indicated by a multi-level header for subdivided columns in the group table.

As another example, the server may identify a multi-row display structure for groups whose search result subgraphs comprise multiple fields of the same type of data, such as subgraphs that include a small collection of names or addresses. Multiple and possibly indented rows, under a main row for the search result, may be used to present each element of a collection. Additionally, these sub-rows may be collapsible.

As another example, the server may again determine to display multi-level search result subgraphs as row-based structures, but to display certain branches or sub-braches as flattened values, mapped to a single column of a row-based display structure. For instance, an address node comprised of a number of sub-nodes for the various fields of the address may be formatted as a single column in a table without any divisions. As yet another example, values closer to the root node (e.g. just top level nodes) may be presented as separate columns, whereas more complex branches or sub-branches may be presented as links to nested structures, by which the user may obtain access to the data in those sub-branches. In an embodiment, customizable rules and thresholds may govern when branches are to be flattened or displayed as links. The rules may be based on the size and/or depth of the search result subgraphs of a group. These rules may further be conditioned, without limitation, upon whether specific types of metadata are found in the search result subgraphs and/or the identity of the requesting user.

Views for search results may also or instead be presented in other display structures, such as trees, charts, graphs, timelines, maps, and so forth. For example, the server may be configured to plot search results that have geolocation fields on a map, with popup bubbles that include data for other fields of the search results. However, it may not make sense to always display search results with geolocation data on a map. To this and other ends, the determination of a display structure may further be based on global preferences, user preferences, metadata annotations, popularity data, and so forth. For example, one rule may state that search results that conform to certain metadata structures should be plotted on a map for a certain user, while other search results should be presented to the certain user as table rows.

In an embodiment, a view may be an aggregation of multiple search results, such as a bubble in a bubble graph or marker in a demographic map. The search report may allow a user to drill-down to a more detailed view such as a table.

5.6. Rendering the Results

At block 670, the server renders at least a portion of the set of search results for presentation to the user, thereby forming a search report. The server may perform block 670 using, for instance, results renderer 178. Rendering comprises generating data or instructions that, when interpreted by the client that issued the search request of block 610, cause the client to display a search report responsive to the search request. The rendering is based on the display structures and mappings identified in block 660. For example, the server may render a set of search results by using the identified data structure and mapping to translate the data in the search results into an HTML or JavaScript stream describing views of the search results. As another example, the server may render a set of search results by generating one or more data structures representative of such views, such as tables or XML elements.

Rendering is performed on a group-by-group basis. Views for search results in the first group (e.g. the first identified group, or the highest ranked group) are displayed before search results for other groups. In an embodiment, search results for a single group are displayed together, embedded in a containing structure, such as a table. The group may be displayed with group metadata such as labels or column headers that explain the meaning of various aspects of each view.

Not all search results for each group are necessarily depicted. For instance, the search report may include views for only the top n results for each group. Or, the report may only include views for the highest ranked results. Groups for which there are no results in the highest ranked results may be collapsed or altogether hidden. The search report may optionally include controls that allow the user to retrieve views for additional results. For example, a button at the beginning or end of each group may allow the user to expand or scroll the group inline to include views for some or all of the remaining results in the group. As another example, such a button may launch a new window that includes views for some or all of the remaining results in the group. Alternatively, the page may contain a button that allows the user to expand multiple groups at once to include views for the next highest ranked results. Or, such a button may launch a new page with views for the next highest ranked results, arranged by group.

Snippets

In an embodiment, the server may reduce the complexity of a search result view by only presenting portions of the data values assigned to certain fields. For example, certain columns of a search result may comprise large amounts of text, pictures, or media. The search result view may contain only small portions of these columns, such as textual excerpts or thumbnails of one or two pictures. These portions, also referred to as snippets, may be selected based on any suitable mechanism for abridging or excerpting content. For example, some suitable techniques for identifying snippets may involve weighting certain portions more heavily than others based on, without limitation, the presence and/or frequency of search terms in the portion, the presence and/or frequency of search terms in metadata (such as captions or hidden markup language) associated with the portion, as well as generic textual analyses of semantics, syntax, or markup.

In an embodiment, various rules may be utilized for identifying when data should be abridged or excerpted. For example, in an embodiment, column values are excerpted once they reach a certain number of characters or words. As another example, in an embodiment, the threshold number of characters or words may be proportional to the number of fields and/or the size of other fields mapped to the display structure for a search result.

In an embodiment, a snippet includes controls that allow a user to request the full contents of the abridged or excerpted field. Selection of the control may display the full value, for example, in a popup window or new tab at the client interface. In an embodiment, selection of the control may show a more detailed view of the entire search result, and not just the field associated with the control.

Highlighting Keywords

In an embodiment, search terms appearing in the rendered view of a search result may be emphasized using any suitable technique, such as the highlighting, increased font weight, different font style, and so forth.

In an embodiment, search terms may occur in field values (or portions thereof) that are not directly displayed in the search result. For example, the snippet for a certain column value may not include all occurrences (or even any occurrences) of a search term. As another example, a search term may appear in a leaf of a sub-branch that is displayed as a link in the view. In an embodiment, the view may include, in association with such fields, indicators of the number of occurrences of each search term in the field. The indicators may be displayed inline with the field and/or as a popup that appears when the user hovers over the field. In an embodiment where a sub-branch is displayed as a link, a popup indicator may include textual excerpt surrounding one or more occurrences of the search term(s) in one or more leaf nodes.

5.7. Returning the Search Results

At block 680, the server returns the report rendered in block 670 to the client via, for instance, a search interface such as search interface 171.

In an embodiment, the rendered search report is delivered as a single data object, such as a web page. In embodiments where only some of the available search results and/or result fields are presented in the search report initially, the server may include in the search report instructions configured to cause the display of the additional results. For example, the rendered search report may include hidden views for additional results that were not configured to be shown initially.

In an embodiment, the search report may be spread out over multiple transmissions from the server. That is, the server sends an initial search report presenting the most relevant search results. The rendered search report may include instructions for making calls to the server's search interface to retrieve views for additional results, if necessary.

In an embodiment, the rendered search report is delivered as a stream, with the server sending more rendered views as they become available. For example, the server may be configured to perform blocks 620-680 in parallel, so that new search results appear at the client as the server finds them. As a consequence of the search report being updated as the search results are discovered, the identified groups, group relevancy, search result relevancy, and/or field relevancy may change over time, thus changing the structure of the search report itself over time.

5.8. Variations

Flow 600 is but one example of a flow for presenting semi-structured search results. Other flows may include fewer or additional elements in potentially varying arrangements. For example, various steps may be performed in parallel. For instance, any of blocks 630, 650, and/or 660 may be performed at the same time, since information about the display formats being considered may affect the relevancy of certain fields and/or grouping. As another example, the rankings of blocks 620 and/or 640 may be delayed for any amount of time up until the search report is about to be returned. As another example, portions of blocks 640-670 may be performed serially for one group before being performed for another group. In an embodiment, a client interacting with the server may perform some or all portions of any of blocks 630-670.

6.0. Functional Overview—Identifying Highly Relevant Search Result Fields

Figure 7:
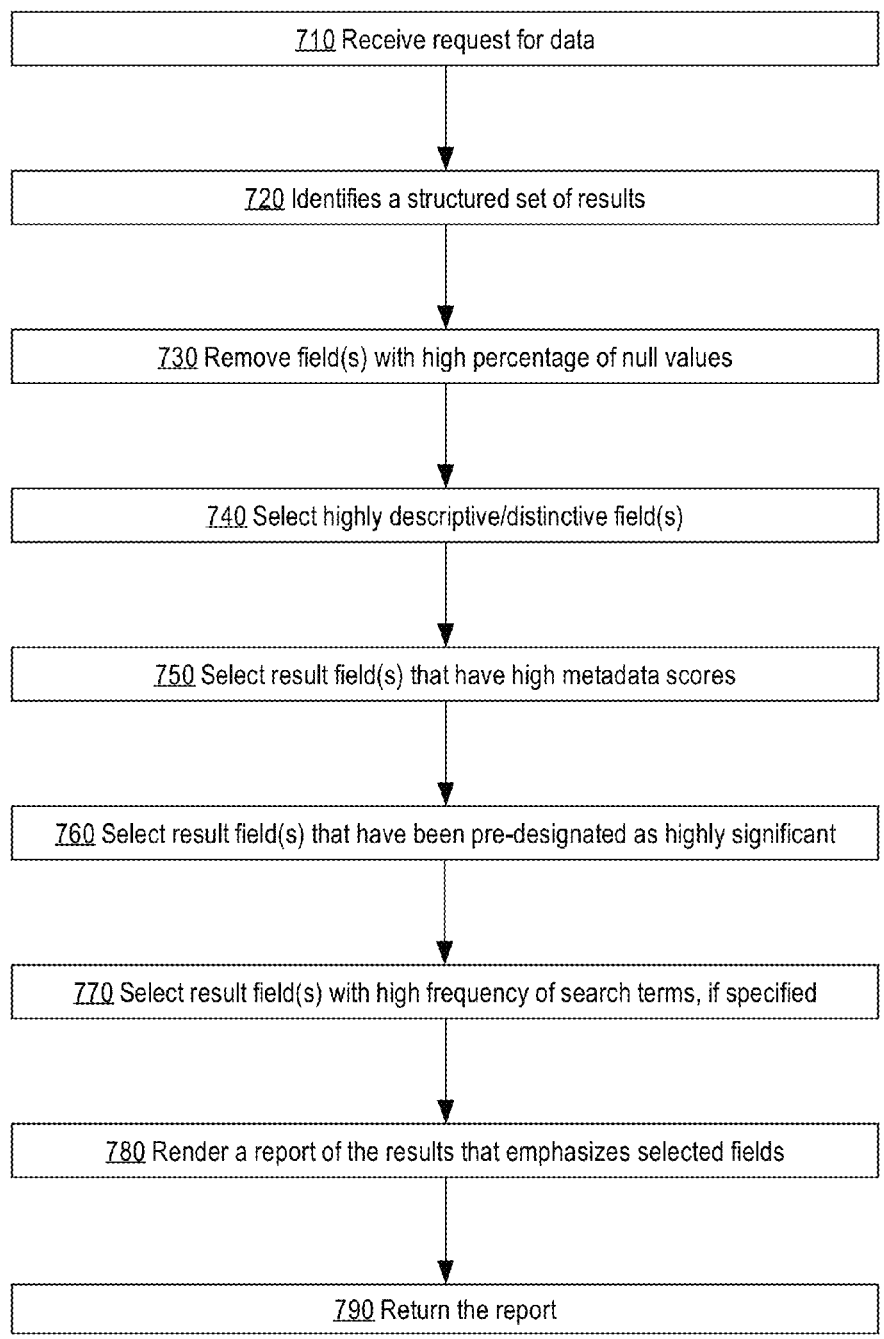
FIG. 7 depicts a flow for emphasizing highly relevant result fields in a report for a structured set of data.

FIG. 7 depicts a flow 700 for emphasizing highly relevant result fields in a report for a structured set of data, according to an embodiment. Flow 700 may be used, for example, to enhance the presentation of the search results delivered in conjunction with flows 200, 300, and/or 600. Flow 700 may also or instead be used to enhance views of data identified via other mechanisms.

At block 710, a server receives a request for data from a requestor. The request comprises criteria. The server may be any computing device, or component thereof, capable of locating and retrieving data objects such as data objects 111. For example, the criteria may be received by search interface 171 of data server 170, a standalone indexing service that accesses a local data repository at a client computer, a relational database server, and so forth. The criteria may including search terms and/or any of a variety of filters or search parameters supported by the search execution component. The criteria need not necessarily involve search terms—for example, the criteria may simply request all data objects belonging to a particular database. In an embodiment, the request is an unstructured query such as described in previous sections. In an embodiment, the request is a structured query, such as a query conforming to a database language such as SQL.

At block 720, a server identifies a structured set of results responsive to the request of block 710. The server may perform block 720, for instance, using results identification component 172 of server 170. The results are a set of data objects retrieved from a data repository based on the criteria of the request. The server may utilize any suitable data retrieval or search technique that produces at least one set of similarly-structured results. For example, without limitation, the server may perform any of the techniques mentioned in this application, including the method of flow 200, other graph-based or candidate network-based techniques, conventional SQL processing techniques, and so forth.

In an embodiment, the structured set may be a subset of semi-structured search results that were identified responsive to a search request, such as identified in block 630 of flow 600. Thus, block 720 may comprise an analysis of the semi-structured set of queries for group(s) of similarly-structured results. Block 720, and the remaining blocks of flow 700, may be performed with respect to each identified group. However, in other embodiments, the structured set constitutes the entire set of search results that were identified responsive to a search request.

In an embodiment, the results in the structured set of results may not conform to exactly the same structure, but may nonetheless be of sufficient similarity that they may be displayed using a same structure, as discussed with respect to block 630 of flow 600.

At block 730, the server scans through the values for each result field, and locates field(s) whose values are frequently or always equal to NULL (or any other value equivalent to null or empty). These fields are marked as having low relevance and removed from consideration in subsequent blocks. In an embodiment, block 730 comprises locating columns in which null values occur above a threshold frequency. This frequency may or may not be customizable by the user.

At block 740, the server analyzes the values in each field to identify highly descriptive and/or distinctive field(s). Such fields are selected as being highly relevant. For example, the server may select fields with high cardinality, including uniquely identifying fields such as member(s) of primary or secondary key(s). In an embodiment, however, even uniquely identifying fields may be ignored if they are not likely to be of interest to the user—for instance, arbitrarily assigned identifiers may be ignored. As another example, the server may select highly descriptive fields that contain a significant amount of text. In an embodiment, only fields that are both descriptive and distinctive are selected.

At block 750, the server selects result field(s) that have high metadata scores. The metadata scores may have been pre-computed and/or are computed dynamically. Techniques for calculating metadata scores are described elsewhere in this disclosure.

At block 760, the server selects result field(s) that have been pre-designated as being highly significant. These designations may have been specified on a per-user, per-user-group, or global basis. These designations may be included in the metadata for a field. In an embodiment, the designations are made by users as they create or manipulate metadata. In an embodiment, the designations may be made by the server based on observations such as how often various fields are requested or examined.

At block 770, the server optionally selects result fields in which search terms, if specified in the request, appear with high frequency. This determination may be based on a threshold frequency and/or a comparison to the frequency of search term occurrence in other fields.

At block 780, the server renders a report comprising views for each result. Each view emphasizes data extracted from or derived from the values of the corresponding result at each selected field. Emphasis may be given by highlighting, other formatting, and/or ordering of fields. Emphasis may also or instead be given by omitting fields that are not selected as highly relevant. The views may simply show all of the values at the selected fields without further processing. The views may instead comprise processed values, including snippets and/or formatted data, as described elsewhere in this disclosure. The exact structure used to view the results may be predefined, or may be determined as described elsewhere in this disclosure.

At block 790, the server returns the report to the client, as described elsewhere in this application.

Flow 700 is but one example of a flow for emphasizing highly relevant result fields. Other flows may include fewer or additional elements in potentially varying arrangements. For example, any one or more of blocks 730-770 may be omitted. As another example, blocks 730-770 may be performed in different orders. As another example, performance of any of blocks 730-770 may be preconditioned on the server having not yet identified a target number of highly relevant fields to display. As another example, performance of blocks 730-770 may be conditioned upon the search result of 720 comprising more than a threshold number of columns.

Blocks 730-770 may be performed, for instance, using a field scoring mechanism, such as field scoring component 176. In an embodiment, rather than select fields in the manner described above, the fields are scored using a function based on any combination of the factors considered in blocks 730-770. Each factor may or may not be weighted differently. Only the top n fields and/or fields whose scores are above a threshold are selected as highly relevant. Furthermore, some factors, such as whether metadata has been pre-designated as highly relevant, may be dispositive in selecting highly relevant fields.

In an embodiment, some or all lower-relevance fields are depicted in the view for a search result. However, higher-relevance fields are emphasized by highlighting or other formatting, or by being displayed first.

7.0. Implementation Examples—Presenting Search Results

Figure 8:
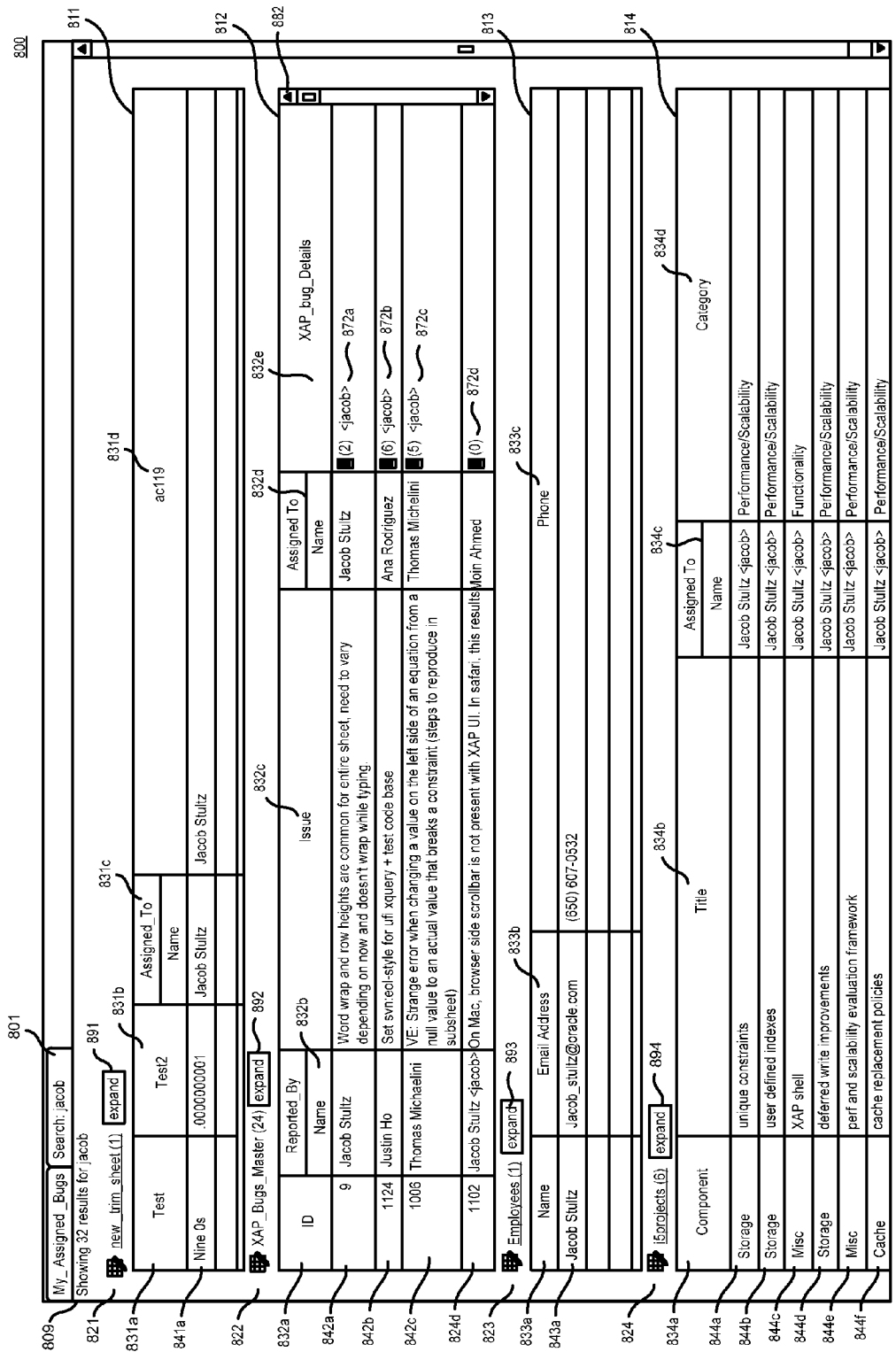
FIG. 8 is a screenshot of an example interface for presenting a search report.

FIG. 8 is a screenshot of an example interface 800 for presenting a search report, according to an embodiment of the invention. Interface 800 may be displayed, for example, in response to a client receiving and interpreting a search report from a server. Interface 800 is one example of an interface for presenting search reports in accordance with the techniques described herein. Other interfaces may comprise additional or fewer elements in varying arrangements.

Interface 800 comprises a search tab 801 that is displayed responsive to receiving a search for the term "Jacob" in a search box (not depicted). Search tab 801 depicts a search report. Search tab 801 includes a search summary 809 indicates statistics about the search, including the number of results shown in the report. Search tab 801 includes four groups 811-814 of search results, each corresponding to a different type of data structure. The data structures to which each group 811-814 correspond are indicated by labels 821-824, respectively. Labels 821-824 may be clicked on to launch a new tab with more information about the respective data structure. Depending on the embodiment, such a new tab may include, without limitation, more detailed information about the search results that conform to the corresponding structure, metadata for the corresponding structure, and/or a complete view of all data objects that conform to the structure.

Groups 811-814 include search result views 841-844, respectively. Each of views 841-844 is a row of information, whose individual cells show some or all of the data values stored in a data object that matched the search for the term "Jacob." View 841a depicts information pertaining to a data object that conforms to structure labeled 821. Views 842a-842d depict information pertaining to data objects that conform to structure labeled 822. View 843a depicts information pertaining to a data object that conforms to structure labeled 823. Views 844a-844f depict information pertaining to data objects that conform to structure labeled 824.

In an embodiment, any of views 841-844 may be clicked upon, in response to which additional information about the data object represented by the corresponding is displayed. Such additional information may be displayed, for instance, in a new tab or pop-up window. The additional information may include, for example, a more detailed view of the data object or a worksheet in which the selected data object is highlighted. In an embodiment, the data in some or all of the cells for each of rows 841-844 may be copied and/or edited.

The cells shown for each of views 841-844 vary according to the structure that corresponds to their respective group 811-814. This information is divided into fields 831-834, which are columns of values. Fields 831-834 each corresponds to a different subelement, attribute, or other component defined for the data objects respectively represented in rows 841-844. For view 841a in group 821, fields 831a-831d are shown. For views 842a-842d in group 822, fields 832a-832e are shown. For view 843a in group 8231, fields 833a-833c are shown. For view 844a-844f in group 824, fields 834a-834d are shown. Fields 831-834 are not necessarily the only fields of the data objects represented by views 841-844. Rather, fields 831-834 may have been selected as the most highly relevant fields for those data objects.

The labels depicted for fields 831-834 are based on metadata that defines the common structures to which groups 811-814 correspond. Most fields 831-834 comprise but a single label corresponding to the label for a single metadata element. However, fields 831c, 832b, 832d, and 834c each comprise two different labels. The upper label, which is "assigned_to" or "reported by," depending on the field, represents the root of a multi-level child node. The lower label, which in all cases in "Name," represents the actual node (e.g. a leaf node or a flattened grandchild node) from which the values in columns fields 831c, 832b, 832d, and 834c were taken. Multi-level labeling may be used in other contexts to represent subnodes of search results having any amount of layers. In an embodiment, had another subelement of "Assigned to" also been relevant to the search results, the field 834c may have been subdivided beginning with the lower label heading box so as to include columns for both "Name" and the other subelement.

In contrast to the multi-level data objects represented by fields 831c, 832b, 832d, and 834c, the multi-level data objects for fields 832e are represented by links 872a-872d as opposed to actual values. The difference between the presentation of field 832e and fields 831c, 832b, 832d, and 834c may have resulted from any of a variety of factors, including the user preferences, historical usage trends, and/or the complexity of the information deemed relevant in the data objects represented by links 872a-872d. Links 872a-872d each include an indication of the number of times search terms are found in the respectively linked data objects. Links 872a-872d are controls that may be selected by a user, in response to which interface 800 may launch a new tab that includes a more detailed view of at least the corresponding data object.

Groups 821-824 are sorted in accordance to a group ranking algorithm. The ranking depicted illustrates the results of one ranking algorithm that could be used. However, other ranking algorithms could be used instead, resulting in different orderings of groups 821-824.

Group 812 includes a scrollbar 882 that allows a user to scroll to additional results (not depicted) for group 812. Groups 811-814 each include an expand control 891-894. Upon selection of a control 891-894, the views of the search results for the corresponding group may be expanded either inline or in a new tab to include additional fields that were originally deemed as less relevant. Alternatively or additionally, if a group is shown with a scroll bar such as scroll bar 882, selection of a control 891-894 may cause the group may be expanded inline so that all search results are shown without need of scroll bar.

Figure 9:
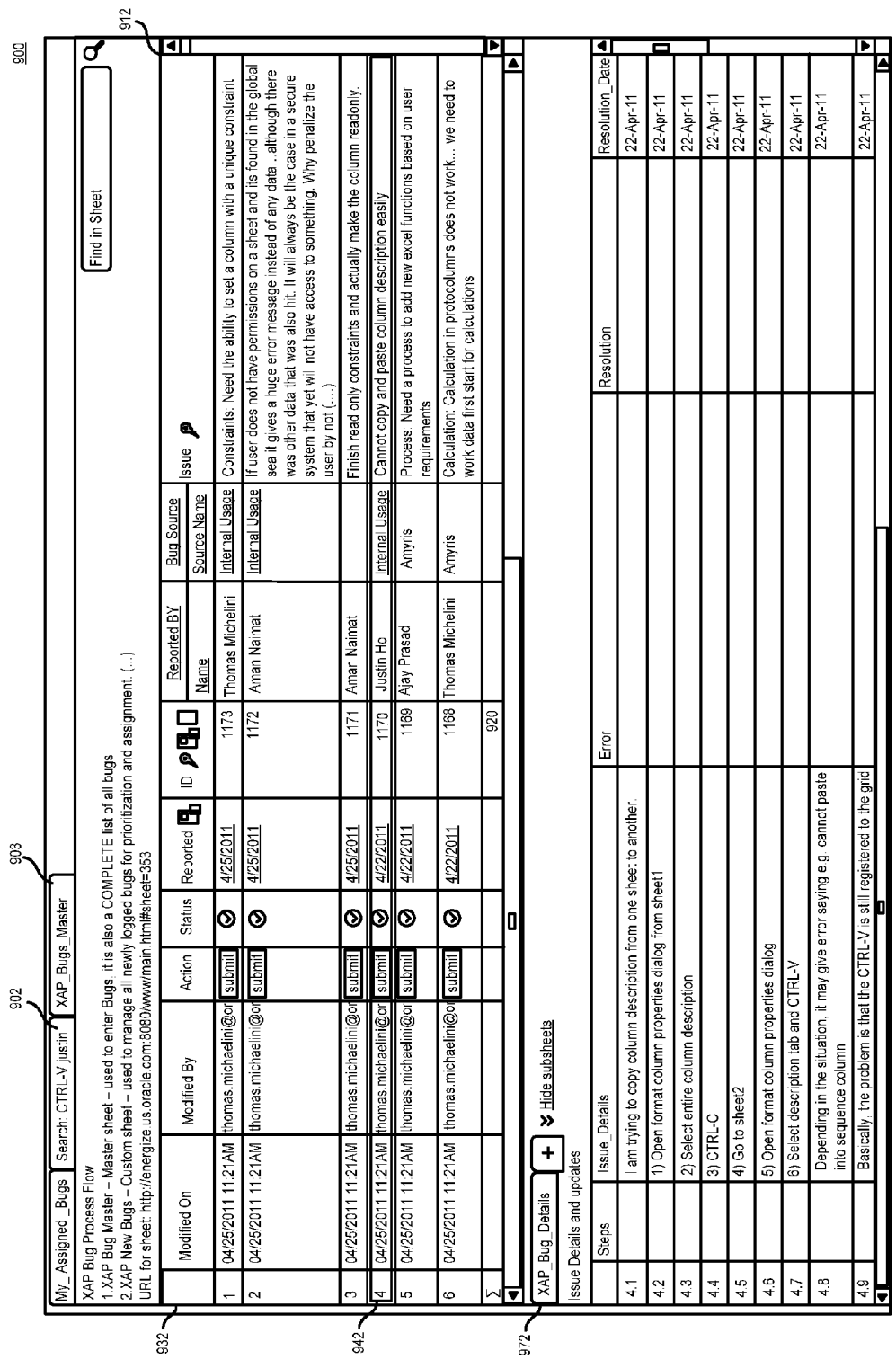
FIG. 9 is a screenshot of an example interface for displaying more detailed data about a sub-branch of a search result.

FIG. 9 is a screenshot of an example interface 900 for displaying more detailed data about a sub-branch of a search result, according to an embodiment. Interface 800 is one example of an interface for presenting more detailed data in accordance with the techniques described herein. Other interfaces may comprise additional or fewer elements in varying arrangements.

Interface 900 comprises a tab 903 that displays a worksheet for a data object named XAP_Bugs_Master, as was also labeled group 822. As depicted, tab 903 was displayed in response to a user having clicked on an item in a search tab 902. However, interface 900 is similar in nature to an interface that may be displayed in response to selecting links 872a-872d of interface 800, or in response to selecting one of fields 842.

Tab 903 comprises a worksheet 912 of data objects that conform to the XAP_Bugs_Master structure. Worksheet 912 comprises a number of rows, including a highlighted row 942. Row 942 corresponds to a data object that was depicted in a search result view search tab 902, upon which the user clicked to launch tab 903. Interface 900 may have scrolled worksheet 912 directly to row 942 in response to the user's selection of the search result view.

Each row of worksheet 912 comprises cells corresponding to fields 932. As with fields 832, fields 932 are not necessarily all of the fields available for the data objects represented in worksheet 912. For example, fields 932 may be just the fields of those data objects determined to be most relevant, in accordance with the techniques described herein.

Tab 903 further comprises an XAP_Bug_Details worksheet 972. Worksheet 972 depicts a collection subnodes (a "subsheet") of the currently selected row 942 in worksheet 912. These subnodes are too complex to depict in worksheet 972. In an embodiment, clicking on a link 872a-872d launches a tab or popup window that contains a worksheet similar to worksheet 972. Alternatively, clicking on link 872a-872d launches a tab similar to tab 903, highlighting the parent row 832a-832d that corresponds to the selected link 872a-872d.

8.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
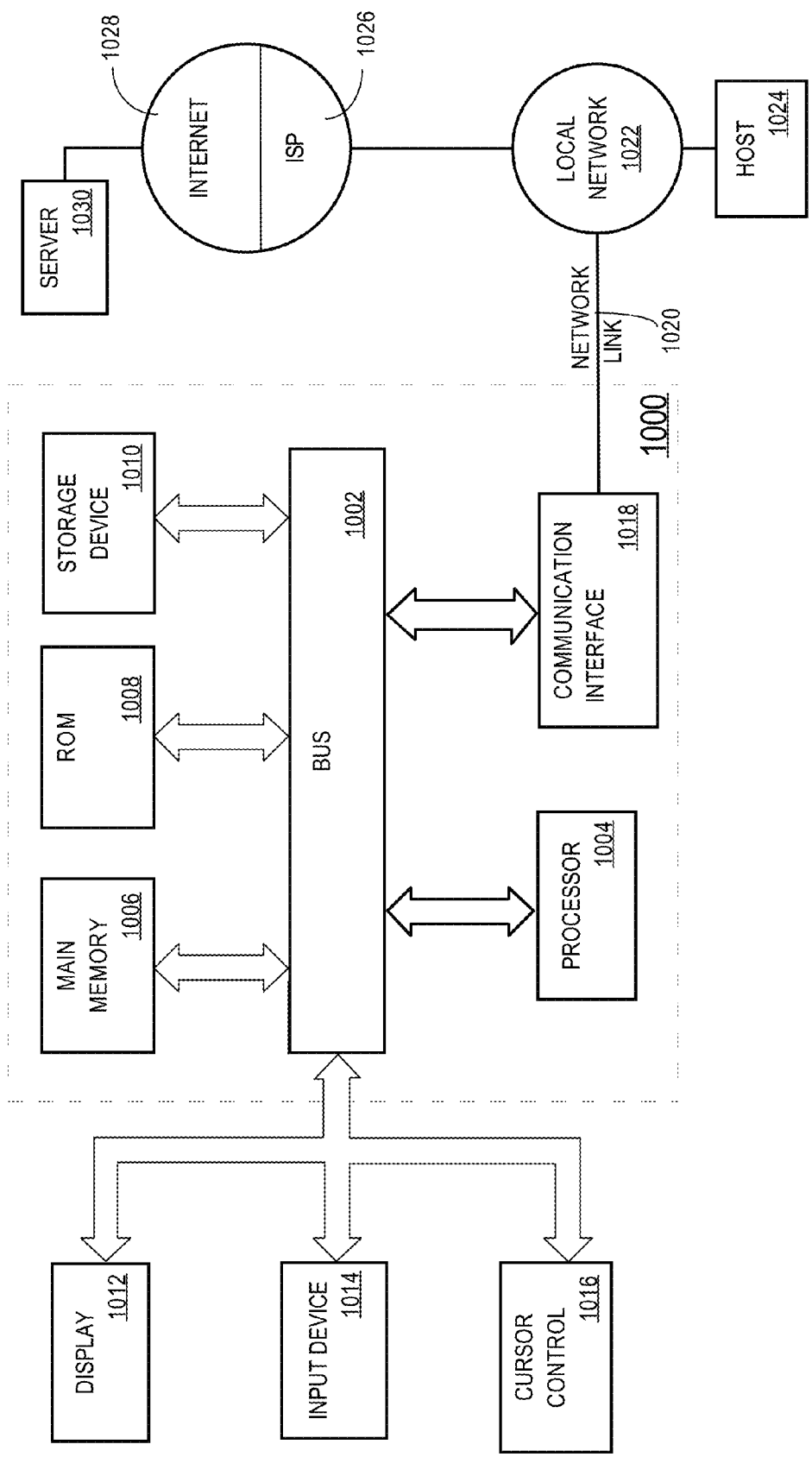
FIG. 10 is block diagram of a computer system upon which embodiments of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

9.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In an embodiment, a method comprises: receiving a search request; identifying search results responsive to the search request; identifying individual rankings for the search results; dividing the search results into groups based on how the search results are structured, wherein for each particular group of said groups, the search results in the particular group conform to a common structure, wherein search results in different groups of said groups conform to different structures; identifying group rankings for the groups; generating a search report responsive to the search request, the search report comprising a plurality of sections including a different section for each group, the plurality of sections ordered by the group rankings, each section comprising views of data belonging to the search results of the section's respective group, the views in each section ordered by the individual rankings; wherein the method is performed by one or more computing devices.

In an embodiment, the method further comprises: identifying, for each group, a) a different display structure and b) a mapping of data from the common structure for the group to the display structure for the group; generating a view for each search result of at least a subset of the search results based at least on the display structure and the mapping that were identified for the group to which the search result belongs. In an embodiment, the method further comprises: identifying, for at least a particular group, a set of highly relevant fields of the common structure corresponding to the particular group; emphasizing data from highly relevant fields in the views for the particular group. In an embodiment, emphasizing data from the highly relevant fields in the views for the particular group comprises omitting data from fields other than the highly relevant fields in the views for the particular group. In an embodiment, the search results comprise two or more differently structured hierarchical data objects. In an embodiment, each view in a set of the views comprises values for leaf nodes of a corresponding data object of the hierarchical data objects. In an embodiment, each view in the set of views omits values for less relevant leaf nodes of the corresponding data object. In an embodiment, each view in the set of views comprises a link to view of a complex descendant node of the corresponding data object. In an embodiment, the search results comprise two or more differently structured data rows. In an embodiment, the search report comprises a plurality of tables; wherein each section is one of the plurality of tables, comprising a plurality of columns that correspond to fields of the common structure for the group corresponding to the section; wherein each view is a row in one of the plurality of tables, comprising a plurality of cells holding data extracted or derived from values for the fields of the common structure for the group; wherein each of the plurality of tables comprises a different set of columns. In an embodiment, the method at least some of the views comprise abridged or excerpted snippets of the data belonging to a corresponding data object. In an embodiment, dividing the search results comprises: determining that a set of the search results is associated with a common metadata element; assigning the set of the search results to a particular group of said groups, wherein the common structure for the particular group is the common metadata element. In an embodiment, dividing the search results comprises: determining that a set of the search results is associated with two or more similar, but different metadata elements; assigning the set of the search results to a particular group of said groups; determining a common display structure for the particular group based on the two or more similar, but different metadata elements.

In an embodiment, a method comprises: receiving a request for data; identifying results responsive to the request, each search request comprising values for a common set of fields; identifying, based on the common set of fields, a subset of highly relevant fields in the common set of fields; generating, for each result of the results, a view of data in the result, the view emphasizing data for the set of highly relevant fields; generating a report comprising each of the views; wherein the method is performed by one or more computing devices.

In an embodiment, emphasizing data for the set of highly relevant fields comprises omitting data for fields other than the highly relevant fields. In an embodiment, emphasizing data for the set of highly relevant fields comprises highlighting columns corresponding to the highly relevant fields. In an embodiment, each of the views is a row of data values belonging to a corresponding result, the row comprising cells of data extracted or derived from values for at least the set of highly relevant fields. In an embodiment, identifying the set of highly relevant fields comprises calculating relevance scores for each field in the common set of fields and comparing the relevance scores. In an embodiment, identifying the set of highly relevant fields is based at least in part on metadata scores identified for metadata defining each field of the common set of fields. In an embodiment, identifying the set of highly relevant fields is based at least in part on the frequency with which null values appear in the results for a particular field of the common set of fields. In an embodiment, identifying the set of highly relevant fields is based at least in part on the distinctiveness of values appearing in the results for a particular field of the common set of fields. In an embodiment, identifying the set of highly relevant fields is based at least in part on data indicating that the user has marked a particular field of the common set of fields as highly relevant. In an embodiment, the request is a SQL statement. In an embodiment, the request comprises search terms.

What is claimed is:

1. A method comprising:
   receiving a request for data;
   identifying a group of results responsive to the request, each result in the group of results comprising values assigned to fields in a common set of fields;
   calculating relevance scores for the fields in the common set of fields;
   selecting from the common set of fields, based on a comparison of the relevance scores, a subset of highly relevant fields for the group of results, the subset of highly relevant fields being smaller than the common set of fields;
   generating, for each result in the group of results, a respective view of data in said each result, the view emphasizing data for the subset of highly relevant fields for the group of results;
   generating a report comprising, for each result in the group of results, the respective view of data in said each result; and
   wherein the method is performed by one or more computing devices.

2. The method of claim 1, wherein emphasizing data for the subset of highly relevant fields comprises omitting data for fields other than the highly relevant fields.

3. The method of claim 1, wherein emphasizing data for the subset of highly relevant fields comprises highlighting columns corresponding to the highly relevant fields.

4. The method of claim 1, wherein for each result in the group of results, the respective view is a row of data values belonging to a corresponding result, the row comprising cells of data extracted or derived from values for at least the subset of highly relevant fields.

5. The method of claim 1,
   wherein a particular field in the common set of fields conforms to one or more constraints specified by particular metadata associated with the particular field; and
   wherein the relevance score for the particular field is based at least in part on a metadata score identified for the particular metadata.

6. The method of claim 1, wherein the relevance score for a particular field of the common set of fields is based at least in part on a frequency with which null values appear in the results for the particular field.

7. The method of claim 1, wherein the relevance score for a particular field of the common set of fields is based at least in part on a distinctiveness of values appearing in the results for the particular field.

8. The method of claim 1, wherein the relevance score for a particular field of the common set of fields is based at least in part on data indicating that a user has marked the particular field as highly relevant.

9. The method of claim 1, wherein the request is a SQL statement.

10. The method of claim 1, wherein the request comprises search terms.

11. One or more non-transitory computer-readable media storing instructions that, when executed by one or more computing devices, cause:
    receiving a request for data;
    identifying a group of results responsive to the request, each result in the group of results comprising values assigned to fields in a common set of fields;
    calculating relevance scores for the fields in the common set of fields;
    selecting from the common set of fields, based on a comparison of the relevance scores, a subset of highly relevant fields for the group of results, the subset of highly relevant fields being smaller than the common set of fields;

generating, for each result in the group of results, a respective view of data in said each result, the view emphasizing data for the subset of highly relevant fields for the group of results; and generating a report comprising, for each result in the group of results, the respective view of data in said each result.

12. The one or more non-transitory computer-readable media of claim 11, wherein emphasizing data for the subset of highly relevant fields comprises omitting data for fields other than the highly relevant fields.

13. The one or more non-transitory computer-readable media of claim 11, wherein emphasizing data for the subset of highly relevant fields comprises highlighting columns corresponding to the highly relevant fields.

14. The one or more non-transitory computer-readable media of claim 11, wherein for each result in the group of results, the respective view is a row of data values belonging to a corresponding result, the row comprising cells of data extracted or derived from values for at least the subset of highly relevant fields.

15. The one or more non-transitory computer-readable media of claim 11,
wherein a particular field in the common set of fields conforms to one or more constraints specified by particular metadata associated with the particular field; and wherein the relevance score for the particular field is based at least in part on a metadata score identified for the particular metadata.

16. The one or more non-transitory computer-readable media of claim 11, wherein the relevance score for a particular field of the common set of fields is based at least in part on a frequency with which null values appear in the results for the particular field.

17. The one or more non-transitory computer-readable media of claim 11, wherein the relevance score for a particular field of the common set of fields is based at least in part on a distinctiveness of values appearing in the results for the particular field.

18. The one or more non-transitory computer-readable media of claim 11, wherein the relevance score for a particular field of the common set of fields is based at least in part on data indicating that a user has marked the particular field as highly relevant.

19. The one or more non-transitory computer-readable media of claim 11, wherein the request is a SQL statement.

20. The one or more non-transitory computer-readable media of claim 11, wherein the request comprises search terms.

* * * * *

UNITED STATES PATENT AND TRADEMARK OFFICE
CERTIFICATE OF CORRECTION

| | | |
|---|---|---|
| PATENT NO. | : 9,015,150 B2 | Page 1 of 1 |
| APPLICATION NO. | : 13/923072 | |
| DATED | : April 21, 2015 | |
| INVENTOR(S) | : Raghavan et al. | |

It is certified that error appears in the above-identified patent and that said Letters Patent is hereby corrected as shown below:

Column 14, line 24, delete "objects's" and insert -- objects --, therefor.

Column 24, line 5, delete "indentifying" and insert -- identifying --, therefor.

Column 29, line 20, delete "the the" and insert -- the --, therefor.

Signed and Sealed this
Ninth Day of February, 2016

Michelle K. Lee
*Director of the United States Patent and Trademark Office*